(12) United States Patent
Choi

(10) Patent No.: US 12,158,348 B1
(45) Date of Patent: Dec. 3, 2024

(54) LATTICE-BASED HEURISTICS COMPUTATIONS FOR AUTONOMOUS DRIVING

(71) Applicant: Zoox, Inc., Foster City, CA (US)

(72) Inventor: Jiwung Choi, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 257 days.

(21) Appl. No.: 17/882,901

(22) Filed: Aug. 8, 2022

(51) Int. Cl.
*G01C 21/34* (2006.01)
*G06N 5/01* (2023.01)

(52) U.S. Cl.
CPC ..... *G01C 21/3446* (2013.01); *G01C 21/3453* (2013.01); *G06N 5/01* (2023.01)

(58) Field of Classification Search
None
See application file for complete search history.

(56) References Cited

U.S. PATENT DOCUMENTS

| 2018/0150081 A1* | 5/2018 | Gross | G01C 21/3446 |
| 2020/0377085 A1 | 12/2020 | Floyd-Jones et al. | |

OTHER PUBLICATIONS

Office Action for U.S. Appl. No. 17/882,868, Date Sep. 5, 2024, 64 pages.

\* cited by examiner

*Primary Examiner* — Hongye Liang
(74) *Attorney, Agent, or Firm* — Lee & Hayes, P.C.

(57) ABSTRACT

Techniques are discussed herein for determining low-cost and/or optimal driving trajectories for autonomous vehicles between various states in a driving environment. A lattice subgraph of lowest-cost trajectories associated with road segments in an environment may be precomputed off-vehicle, and provided to vehicles in the environment along with map data, lane graphs, etc. An autonomous vehicle may use the lattice subgraphs to determine costs associated with discrete entry points of the road segments along a driving route, and may perform additional computations using motion primitives and/or cost plots to determine costs associated with controlling the vehicle between various states to the discrete road segment entry points. The lattice subgraphs may be grouped and cost computations for the states within the various lattice subgraphs can be performed by the vehicle in parallel, to provide reduced computational complexity and faster computations of low-cost driving trajectories.

20 Claims, 11 Drawing Sheets

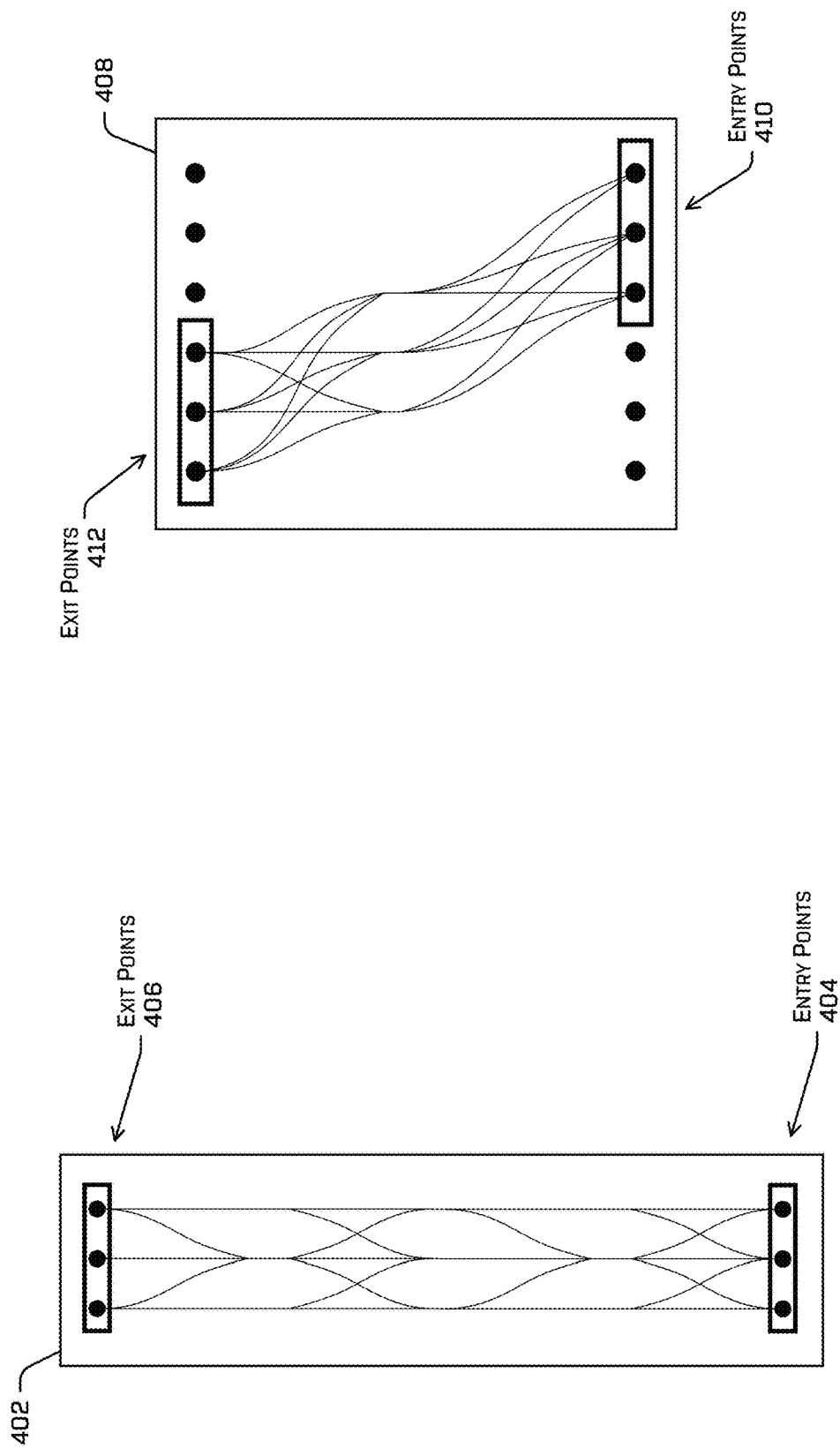

COST PLOT 800A

COST PLOT 800B

LATTICE-BASED HEURISTICS COMPUTATIONS FOR AUTONOMOUS DRIVING

BACKGROUND

Manual functionality of vehicles is increasingly being supplemented or replaced with automatic controls. Autonomous driving may benefit from computing systems capable of determining driving paths and navigating along designated routes from an initial location toward a destination. For example, an autonomous vehicle may utilize various systems and components to traverse through a driving environment including various static and dynamic objects, including moving and stationary vehicles (autonomous or otherwise), people, buildings, and other objects. When traversing through such an environment, an autonomous vehicle may rely on map data received of the environment and/or roadway indicators detected by vehicle sensors, such as lane boundaries, traffic signs and signals, etc. However, determining paths to safely and efficiently navigate complex driving environments may present challenges for autonomous vehicles. For example, driving path selection and/or optimization techniques taking into account various considerations such as kinematic and/or dynamic (kino-dynamic) feasibility, passenger safety and comfort, driving efficiency, route continuity, and the like, may require significant computing resources and computational complexity that cannot be performed sufficiently quickly or accurately on the vehicle in real-world driving scenarios to enable safe operation.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIGS. 4A-4E illustrate examples of lattice subgraphs associated with one or more road segments along a driving route, in accordance with one or more examples of the disclosure.

FIG. 8A illustrates example values indicated by x and y locations of a cost plot at the yaw values identified in FIG. 8B.

DETAILED DESCRIPTION

Figure 1:
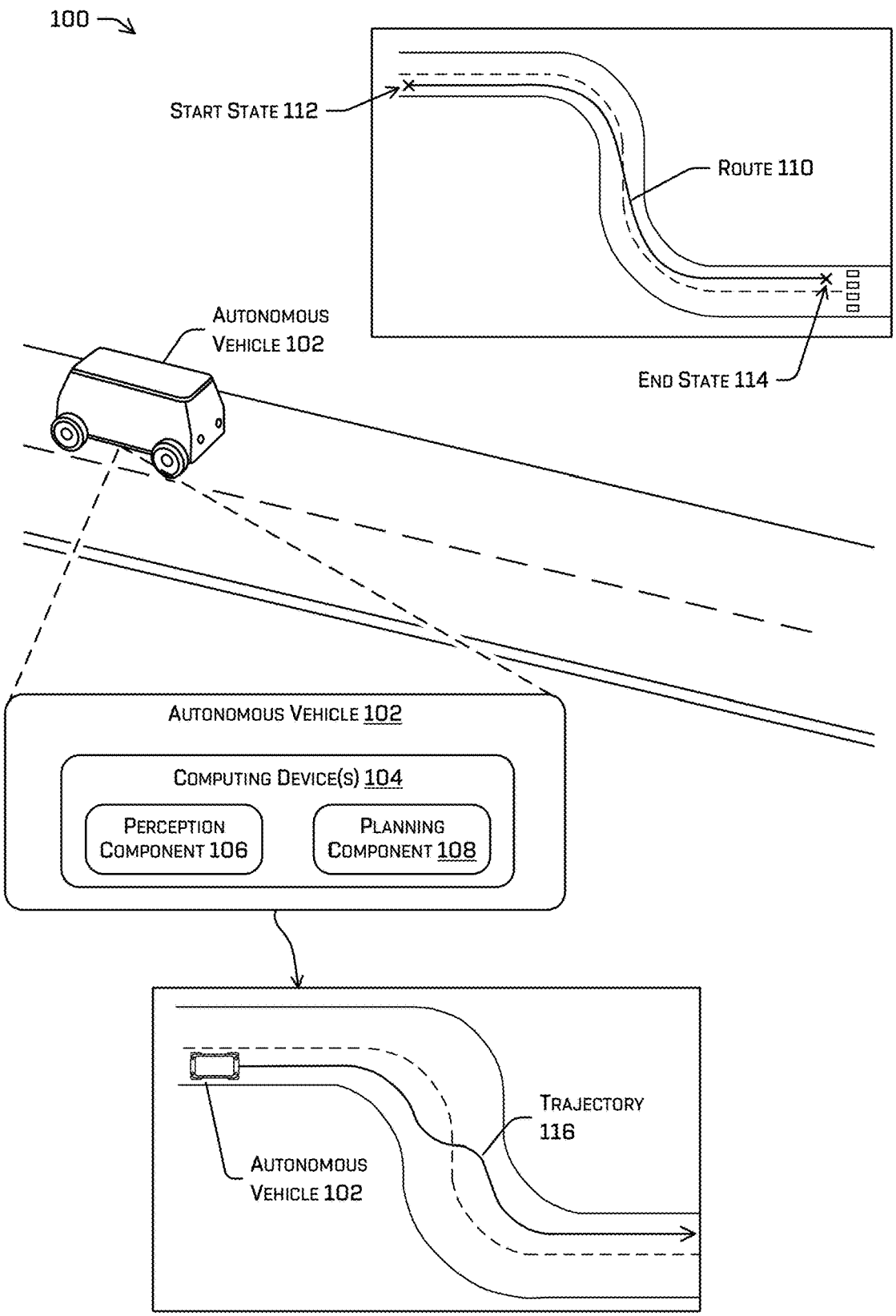
FIG. 1 illustrates an autonomous vehicle and an example scenario in which a driving trajectory is determined to control the autonomous vehicle along a route in an environment.

This application relates to determining driving trajectories for autonomous vehicles between various states (and/or positions) in a driving environment. In some examples, the techniques described herein may include precomputing lattices and lattice subgraphs of lowest-cost trajectories for associated road segments and combinations of road segments in an environment. The lattice subgraphs may be precomputed, for example, on separate computing devices external to an autonomous vehicle, and may be provided to the vehicle with the associated map data, lane graph data, etc., based on the location of the vehicle within the environment (e.g., by performing a query of a data store of such graphs based on, for example, a geographic location). An autonomous vehicle may receive and use the map data (e.g., including a road network database with defined road segments) and the corresponding lattice and subgraph data to determine costs associated with pairs of entry states and exit states of the road segments along a route. For example, based on a determined driving route including a start state (e.g., including a geometric state and/or a temporal state) and an end state, the autonomous vehicle may determine a number of road segments (which also may be referred to as lane segments) associated with a driving route. The autonomous vehicle may receive the lattice subgraphs associated with the road segments along the driving route, and may use the lattice subgraphs to determine costs associated with controlling the vehicle between a number of discrete entry points for the road segments and the end state of the route. The autonomous vehicle also may use motion primitives and/or a cost plot to determine additional costs associated with controlling the vehicle between various states in the environment, and the discrete road segment entry states. Based on combinations of the costs associated with the road segment entry states, and the additional costs computed by the vehicle using the motion primitives and/or cost plots, the autonomous vehicle may determine overall heuristic costs (e.g., a "cost to go") associated with controlling the vehicle between various states in the environment and the desired end state of the route.

As illustrated in various examples and descriptions below, the techniques herein may be implemented in a number of ways to improve the operation of autonomous vehicles and the functioning of computing systems. For example, these techniques may improve the functioning, safety, and efficiency of autonomous and semi-autonomous vehicles operating in real-world driving environments, by determining improved driving trajectories (which also may be referred to as driving paths) through the environments based on passenger and vehicle safety, driving efficiency, kino-dynamic feasibility of the vehicle, and various other heuristic cost-based metrics.

For instance, examples described herein may include determining heuristic costs associated with various vehicle states in the environment, and determining lowest-cost and/or optimal driving trajectories based on the heuristic costs. Any number of search algorithms configured to compute shortest path distances, minimum costs, etc., can be used to determine the optimal or lowest-cost driving trajectory in such examples. For instance, graph search algorithms including but not limited to D*, D*lite, Focused Dynamic A*, A*, LPA*, Dijkstra's algorithm, and/or the like can be used in various examples. However, graph search algorithms are computationally expensive, and applying such algorithms on autonomous vehicles to determine driving trajectories can be impractical. For instance, autonomous vehicles may operate in wide and complex driving environments, and may be desirable in some instances to determine a future driving trajectory over a large area covering several seconds of driving time. However, the computational complexity of graph search algorithms like Dijkstra's algorithm grows exponentially as a function of the size of the search graph, which may make it difficult or impossible for the vehicle to execute the search algorithm to determine an optimal driving trajectory within a large driving area in real-time.

To address the issues caused by the computational complexity of graph search algorithms, the techniques described herein may include precomputing lattice subgraphs associated with individual road segments (e.g., lane segments) and/or combinations of road segments in the driving environment. For instance, for an individual road segment, a lattice subgraph includes a reduced number of costs, corresponding to the costs associated with controlling the vehicle between a discrete number of entry points and exit points (which also may be referred to respectively as entry states and exit states) on the boundary of the road segment. The sparse lattice subgraphs for individual road segments also may be grouped in combinations based on a received driving route, so that the resulting grouping of lattice graphs includes fewer nodes and a smaller search space. As a result, the autonomous vehicle may execute graph search algorithms on the grouped lattice graphs associated with the route much more quickly and with far fewer computations.

Additionally, in some examples described herein, the autonomous vehicle may perform a multi-stage computational process in which a graph search algorithm is executed on the grouped lattice during an initial first stage to determine a heuristic cost associated with each road segment entry point in the grouped lattice. After the first stage, the autonomous vehicle may apply dynamic programming to reuse the lowest cost path from each intermediate point to each possible exit points of the road segment combined with the heuristic costs on the exit points computed in the first stage, to compute heuristic costs associated various states in the environment. In such examples, the heuristic cost computations of the second stage may be performed independently for each lattice subgraph. As a result, the second stage computations may be performed for the lattice subgraphs in parallel, rather than sequentially like other graph search algorithms, thereby allowing the autonomous vehicle to determine the heuristic costs for various states within the environment much more quickly. In some examples, the autonomous vehicle may use one or more GPUs (or other similar parallel compute architectures) for parallel execution of the second stage computations for the lattice subgraphs, further improving the computation time.

Further, precomputation of the lattice subgraphs using separate computing devices and systems (e.g., off-vehicle), may allow for more robust and flexible heuristic cost computations corresponding to particular road sections in the environment. As described in more detail below, off-vehicle precomputation of the lattice subgraphs may be performed based on corresponding map data of the environment, the kino-dynamic feasibility of the vehicle, and/or any number of cost-based driving policies related to driving path efficiency, driving safety, passenger comfort, etc. Such techniques also may allow the precomputed lattice subgraphs to incorporate cost-based rules and/or penalties associated with particular vehicle behaviors and/or driving maneuvers. For instance, computing devices precomputing the lattice subgraphs may impose lane-ending penalties by applying costs within the lattice subgraphs, in order to encourage the autonomous vehicles to determine driving trajectories in which lane changes are performed earlier.

As illustrated in various examples and descriptions below, the techniques herein may be implemented in a number of ways to improve the operation of autonomous vehicles and the functioning of computing systems. For example, these techniques may improve the functioning, safety, and efficiency of autonomous and semi-autonomous vehicles operating in real-world driving environments, by determining improved driving trajectories (or paths) through the environments based on passenger and vehicle safety, driving efficiency, kino-dynamic feasibility of the vehicle, and various other heuristic cost-based metrics.

Various examples described herein may include determining trajectories and/or driving paths for autonomous vehicles to follow when traversing a driving environment. As used in such examples, a "path" may refer to a sequence of spatial (e.g., geometric) states, in which each spatial state corresponds to a point or position in the path, and each spatial includes a combination of geometric data such as an x-position, y-position, yaw, and/or steering angle, etc. In contrast, in such examples, a "trajectory" may refer to a sequence of spatiotemporal states rather than geometric states. For example, a trajectory may be defined as a sequence of spatiotemporal states, in which each state is specified by any combination of an x-position, a y-position, a yaw, a yaw rate, a steering angle, a steering angle rate, a velocity, and/or an acceleration, etc.

Similarly, in various examples described herein, trajectories and/or driving paths may be determined as sequences of positions (or points), or as sequences of states. As used in such examples, a "position" (or "point") may refer to a geometric (or spatial) state including position data (e.g., x-position, y-position, yaw, steering angle, etc.). In contrast, in such examples, a "state" may refer to a combination of a geometric state and/or a temporal state, which may include x-position, y-position, yaw, yaw rate, steering angle, steering angle rate, velocity, and/or acceleration, etc.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a sensor system or a robotic platform), and are not limited to autonomous vehicles. In one example, similar techniques may be utilized in driver-controlled vehicles in which such a system may provide an indication of whether it is safe to perform various maneuvers. In various other examples, the techniques may be utilized in an aviation or nautical context, and may be incorporated into any ground-borne, airborne, or waterborne vehicle using route planning techniques, including those ranging from vehicles that need to be manually controlled by a driver at all times, to those that are partially or fully autonomously controlled.

FIG. 1 illustrates an example scenario 100 including an autonomous vehicle 102 comprising the lattice-based vehicle navigation system discussed herein. In some instances, the autonomous vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 102 may be a fully or partially autonomous vehicle having any other level or classification. It is contemplated that the techniques discussed herein may apply to more than robotic control, such as for autonomous vehicles. For example, the techniques discussed herein may be applied to trajectory-finding in video games, manufacturing, augmented reality, etc.

The autonomous vehicle 102 may comprise computing device(s) 104 that may include one or more ML models and/or the navigation system discussed herein. For example, the computing device(s) 104 may comprise a perception component 106 and/or a planning component 108, which may comprise one or more ML models and may be parts of the navigation system discussed herein. For example, the perception component 106 and/or the planning component 108 may comprise the hardware and/or software for conducting the operations discussed herein related to the navigation of the autonomous vehicle 102. The navigation system may comprise more or less components, but the perception component 106 and/or planning component 108 are given as a non-limiting example for the sake of comprehension.

In some examples, the various vehicle navigation systems and functionalities described herein may comprise processor-executable instructions stored in a memory of the computing device(s) 104 and/or accessible thereto, hardware, and/or some combination thereof (e.g., a field-programmable gate array (FPGA), application-specific integrated circuit (ASIC)).

In the example scenario 100, the autonomous vehicle 102 has received and/or determined a route 110 defining a start state 112, an end state 114, with one or more curves between the start state 112 and the end state 114. For example, the planning component 108 may have determined the route 110 based at least in part on sensor data, map data, and/or based on an end state received as part of a mission (e.g., from a passenger, from a command center, etc.). As noted above, references to a "state" or "vehicle state" may include geometric state data, such as position (or location) and/or a pose (e.g., position and/or orientation/heading including yaw and steering angle) of a vehicle. Additionally, in some examples, a vehicle state may comprise any combination of a geometric state data for a vehicle, as well as temporal state data for the vehicle (e.g., a velocity, acceleration, yaw, yaw rate, steering angle, steering angle rate, etc.) and/or may include any other status data associated with the vehicle (e.g., current vehicle status data, the status of vehicle signals and operational controls, etc.).

As the vehicle operates to reach the end state 114, the autonomous vehicle 102 may encounter a scenario like example scenario 100 in which a planner that is reliant on the lane reference data (e.g., determined based at least in part on a map and/or localizing the autonomous vehicle 102) to generate a trajectory may not accurately and/or efficiently generate a trajectory. However, as discussed herein, the planning component 108 may use lattice-based heuristics computations to generate a trajectory 116 for the vehicle to follow from the start state 112 to the end state 114. The trajectory 116 may be an improved trajectory based on shortest trajectory and/or minimization of heuristics-based costs associated with the kino-dynamic feasibility of the vehicle, safety and passenger comfort, driving efficiency and/or continuity, etc.

In some examples, the autonomous vehicle 102 may receive sensor data from sensor(s) of the autonomous vehicle 102 (e.g., a GPS signal), an inertia signal (e.g., an accelerometer signal, a gyroscope signal, etc.), a magnetometer signal, a wheel encoder signal, a speedometer signal, a point cloud of accumulated lidar and/or radar points, time of flight data, an image (or images), an audio signal, and/or bariatric or other environmental signals, etc. The perception component 106 may include one or more ML models and/or other computer-executable instructions for detecting, identifying, segmenting, classifying, and/or tracking objects from sensor data collected from the environment of the autonomous vehicle 102. For example, data generated by the perception component 106 may be used by the autonomous vehicle 102 to localize its position within the driving environment relative to the map data. In some instances, the perception component 106 also may generate drivable surface maps and/or occupancy maps indicating which areas of the environment are drivable and non-drivable surfaces, as well as which locations within the environment are occupied by objects or are free space locations that are unoccupied and in which autonomous vehicle may operate.

The planning component 108 may use perception data determined by the perception component 106 based on sensor data, as well as map data, localization data, etc., to determine the trajectory 116, determine one or more trajectories based at least in part on the trajectory 116, control motion of the autonomous vehicle 102 to traverse the trajectory or route (e.g., by transmitting one or more trajectories to control components of the autonomous vehicle 102), and/or otherwise control operation of the autonomous vehicle 102, though any such operation may be performed in various other components.

In some instances, the planning component 108 may use perception data, map data, and/or a current state of the autonomous vehicle 102, and/or the route 110 and/or trajectory 116 to generate instructions for controlling the operations of the autonomous vehicle 102. As described in more detail below, the planning component 108 may determine the trajectory 116 as a lowest-cost trajectory for the autonomous vehicle 102 from the start state 112 to the end state 114, based at least in part on the lane graphs and lattice subgraphs associated with the road segments along the route 110, and may use graph search algorithms, cost plots and/or one or more motion primitives, as discussed further herein. Although in this example the planning component 108 determines a single trajectory 116, in other examples, the planning component 108 may determine any number of alternative low-cost trajectories using the techniques described herein. To implement a driving trajectory (e.g., trajectory 116), the planning component 108 may generate, substantially simultaneously, a plurality of potential trajectories for controlling the motion of the autonomous vehicle 102 in accordance with a receding horizon technique (e.g., 1 micro-second, half a second, multiple seconds, etc.) and based at least in part on the trajectory 116, and/or selecting one of the potential trajectories as a trajectory of the autonomous vehicle 102 that may be used to generate a drive control signal that may be transmitted to drive components of the autonomous vehicle 102 to control the autonomous vehicle 102 to traverse the trajectory 116.

Figure 2:
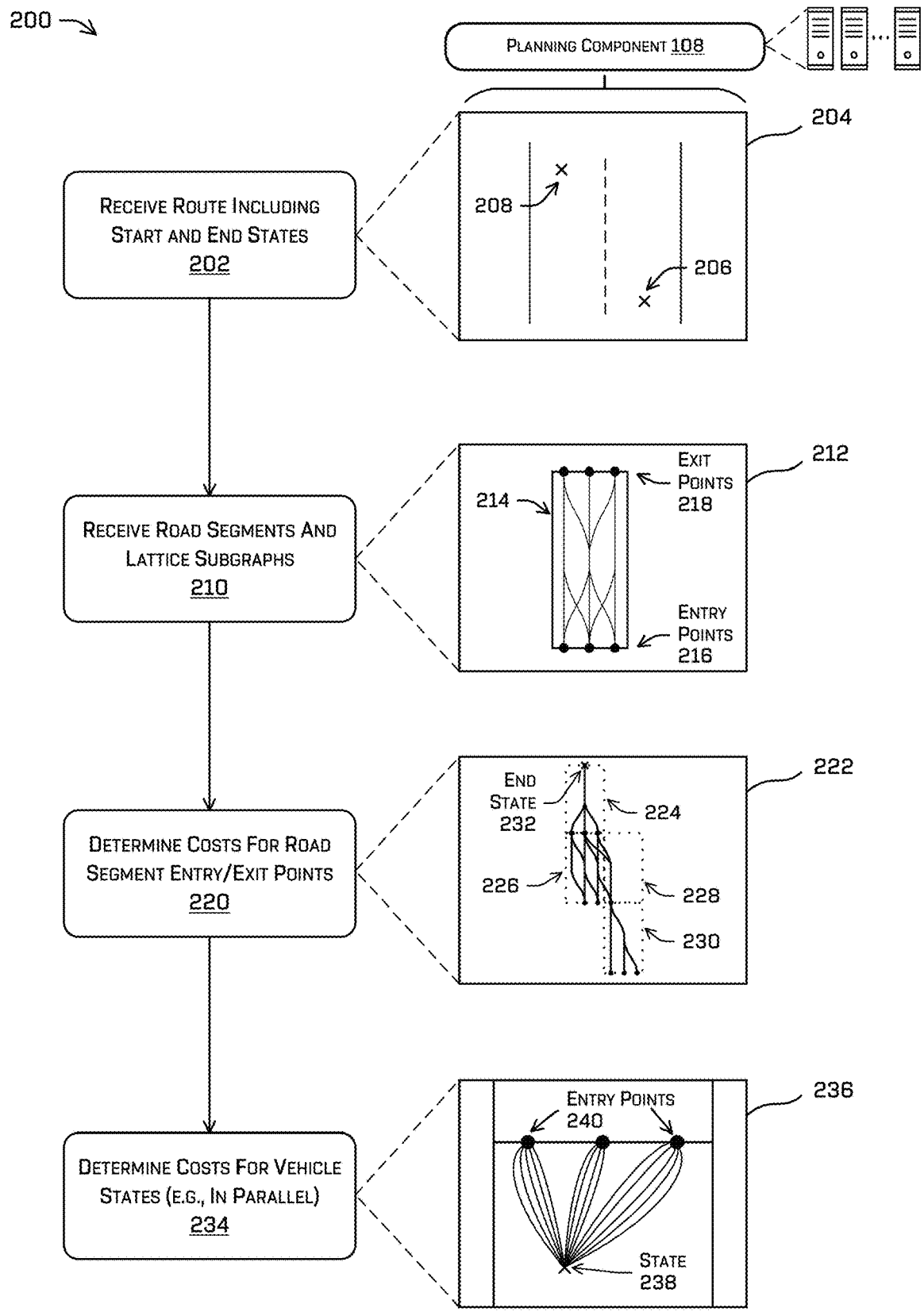
FIG. 2 illustrates an example technique for an autonomous vehicle to determine costs associated with various states relative to an end state in a route, in accordance with one or more examples of the disclosure.

FIG. 2 depicts an example process 200 for an autonomous vehicle to determine heuristic costs associated with various states in an environment. As noted above, although this example refers to a "state" of a vehicle, the vehicle states described herein can include any combination of geometric state data (e.g., a position or location of a vehicle, a pose including orientation/heading, yaw, and/or steering angle data) and/or temporal state data (e.g., yaw rate, steering angle rate, velocity, acceleration, etc.). As described herein, a heuristic cost associated with a state may represent the cost of controlling a vehicle from a state (e.g., a geometric state and/or temporal state of the vehicle) to the end state (e.g., end geometric state and/or end temporal state) of the desired driving route. In order to determine a lowest-cost and/or optimal driving trajectory, the planning component 108 may evaluate the heuristic costs associated with various different states in the environment. Accordingly, the operations described below in process 200 may be performed by the autonomous vehicle 102 for any number of different states, including the start state of the route as well as various intermediate states.

At operation 202, the planning component 108 may receive (and/or determine) a driving route for the autonomous vehicle 102 in the environment. As described above, the driving route may include at least a start state representing the current state of the vehicle in the environment (e.g., including a current vehicle location, pose, and/or state), and an end state representing a desired state (e.g., including a location, pose, and/or temporal state) of the vehicle toward a destination. Box 204 depicts an example driving scene showing a start state 206 in a right lane of a road and an end state 208 further down and in the left lane of the same road.

At operation 210, the planning component 108 may receive map data including data identifying road segments and/or lattice subgraphs associated with the route. In some examples, the map data received by the autonomous vehicle 102 (e.g., over wireless networks from map data servers and/or remote computing devices) may include road data defining one or more road segments (e.g., lane segments) corresponding to portions of road in the proximate environment of the vehicle. Between the start state 206 and the end state for an intended route, the map data may include multiple road segments, which may represent continuous sections of the same driving lane and/or adjacent (e.g., side-by-side) road segments of different driving lanes. For each road segment, the autonomous vehicle 102 may receive data indicating the location (e.g., boundaries), size (e.g., length and width), and shape (e.g., curvature) of the road segment, as well as additional attributes of the road segment such as directionality, speed limit, gradient, road surface, etc.

The autonomous vehicle 102 also may receive lattice subgraphs associated corresponding to the road segments for the route. As noted above, a lattice subgraph may include a set of costs associated with controlling the autonomous vehicle 102 between a discrete number of entry points and a discrete number of exit points along the boundary of a corresponding road segment. As used herein, an entry point of a lattice subgraph may include a point on the boundary of the corresponding road segment that is closer to the start state of the route, so that the autonomous vehicle 102 may potentially enter the road segment at the entry point while driving the driving trajectory from the start state to the end state. In contrast, an exit point may include a point on the boundary of the road segment that is closer to the end state of the route, so that the autonomous vehicle 102 may potentially exit the road segment at the exit point while driving the driving trajectory.

In some examples, a lattice subgraph may be associated with an individual road segment, and a set of lattice subgraphs may be generated and provided to the autonomous vehicle 102 corresponding to the road segments on or near the route. Additionally or alternatively, lattice subgraphs may be associated with combinations of multiple road segments. For instance, a single lattice subgraph may be constructed based on a pair (or larger group) of adjacent road segments, representing continuous sections of the same lane and/or side-by-side lane sections. In such examples, the lattice subgraph may include the lowest costs associated with controlling the vehicle between each entry point and each exit point within the combined group of the road segments. Additional examples of lattice subgraphs associated with combinations of multiple road segments are described below in reference to FIGS. 4B-4E.

Box 212 depicts an example lattice subgraph 214 associated with a single road segment. In this example, the lattice subgraph 214 includes three entry points 216 and three exit points 218, and the lattice subgraph 214 may include edges corresponding to the lowest costs associated with controlling the vehicle between each of the entry points 216 and each the exit points 218. Although three entry points and three exit points are shown in this example, it can be understood that any number of entry and/or exit points may be defined for a lattice subgraph in other examples (e.g., 1, 2, 4, 5, 6, . . . ). The number of entry points for a lattice subgraph also need not be the same as the number of exit points, as it is in this example, and any number of entry points and exit points may be used in various examples. Additionally, although the entry and exit points in this example are depicted on at points on the front and back of the road segment, in other examples any number of entry and/or exit points may be positioned on the side boundaries of road segments to support determining lowest-cost driving trajectories that include lane changes between side-by-side road segments.

As noted above, the number of entry and exit points selected for a lattice subgraph may affect a tradeoff between the computational resources required to determine the lowest-cost driving trajectory and the quality of the determined lowest-cost driving trajectory. For instance, increasing the numbers of entry and/or exit points in the lattice subgraphs used by the autonomous vehicle 102 may increase the computational costs, but may improve the quality of the driving trajectories determined using these techniques. In contrast, decreasing the numbers of entry and/or exit points in the lattice subgraphs may reduce computational costs but also may reduce the quality of the driving trajectories output by these techniques.

At operation 220, the planning component 108 may determine the set of heuristic costs associated with the entry points and/or exit points of the road segments within the routes. Box 222 depicts an example in which the planning component 108 may use a group of adjacent lattice subgraphs 224, 226, 228, and 230 in the region between a start state and an end state 232 in a route. In this example, each lattice subgraph may correspond to a single road segment, and the planning component 108 may determine the heuristic costs associated with each entry point in the combined lattice by summing the costs within the individual lattice subgraphs. In cases when multiple lattice trajectories are possible between the end state 232 and an entry point, the planning component 108 may calculate all possible trajectory costs and select the lowest-cost trajectory, and/or may perform a graph search algorithm to determine the lowest-cost trajectory. The planning component 108 may start from the end state 232 and work back to the entry points at the edges of the combined lattice (e.g., a "cost to go"), or may start from a starting state (e.g., a current or potential state of the vehicle) and work forward from the entry points to the end state 232 (e.g., a "cost to come"). As discussed above, because the lattice subgraphs have precomputed the lowest-cost paths between all possible entry and exit points, which is much fewer than the entire possible paths in the lattice, the computational costs associated with determining the lowest-cost trajectory to all entry points in the combined lattice subgraphs 224-230 may be performed relatively quickly either with or without executing a search algorithm.

In some examples, operation 220 may include determining which road segments and/or which lattice subgraphs are to be included in the combined lattice from which heuristic costs are computed by the planning component 108 for the entry and exit points in operation 220. The combined lattice in box 222 depicts four separate individual lane segments, and in some examples, an individual lattice subgraph may be received for each separate lane segment. Additionally or alternatively, a single lattice subgraph may correspond to a combination of multiple adjacent lane segments. For instance, in this example the lattice subgraphs received by the vehicle may include four individual lattice subgraphs corresponding to the four lane segments, as well as an additional lattice subgraph combining subgraphs 226 and 228, to allow the connected paths (e.g., lane changes) through the route.

To determine the lattice subgraphs used in operation 220, the planning component 108 may determine the lattice subgraphs encompassing the start state, the end state, the route between the start and end states (e.g., when a continuous route is available) or encompassing the region of the environment between the start and end state along a straight-line trajectory or lane directionality trajectory. Additionally, in some cases the planning component 108 may include additional lattice subgraphs (e.g., on the left/right sides of the route) in the combined lattice analyzed in operation 220, to allow for more indirect potential lowest-cost driving trajectories to be discovered by the driving trajectory search.

At operation 234, the planning component 108 may determine the heuristic costs associated with various states in the environment. As noted above, the heuristic cost for a state may refer to the cost associated with controlling the vehicle from the state (which may include the vehicle's position, pose, and/or other geometric state or temporal state data) to the end state of the intended route. To determine the heuristic cost for a vehicle state in operation 234, the planning component 108 may use one or more cost plots (e.g., based on motion primitives for the type/model of the vehicle) to determine costs associated with controlling the vehicle from a particular state at a particular position, to the entry states and/or exit states of the lattice subgraphs associated with the route. In some examples, the costs determined for some or all of the intermediate points may be updated during operation 220. To perform the computations in operation 220, the planning component 108 may use the predefined lattice control (e.g., edge) costs, and need not use cost plots or motion primitives. Dynamic programming may be used in such examples, by reusing the lowest cost from an intermediate point to an exit point in the subgraph, in combination with (e.g., summing) the costs associated with the exit points. The costs of most positions may be determined by interpolating the costs on the lattice discrete points. In some examples, cost plots may also be used additionally and/or alternatively. For instance, a cost plot may be used as an alternative to the edge cost data only when the query position differs from the lattice discrete points by sufficiently large amount (e.g., greater than a threshold).

As described below, in some cases the planning component 108 may compute different sums representing the different transition costs through the lattice subgraphs from a particular state to a desired end state (which may or may not be an entry state or exit state of a lattice subgraph). For example, box 236 depicts a state 238 and three entry states 240. The state 238 may be a start state (e.g., the current vehicle state) or may be any other state along a potential driving trajectory toward an end state. Relative to the combined lattice subgraph in box 222, the state 238 may correspond to a position in front (e.g., below) or to the side of the combined lattice subgraph, or may correspond to a position within any of the individual lattice subgraphs 224-230 depicted in box 222. Additionally, the entry states 240 may represent the entry states to any of the lattice subgraphs in box 222. For instance, for a state 238 in front of the combined lattice subgraph, the entry states 240 may represent the entry points of lattice subgraph 230.

The planning component 108 may then use the combination of the heuristic costs determined from the state 238 to the entry states 240 (e.g., determined using a cost plot), and the heuristic costs determined from the entry points of the combined lattice to the end state 232 (e.g., determined in operation 220), to determine the total heuristic cost for the state 238. For example, the planning component 108 may sum the heuristic cost from the state 238 to a particular entry point and the heuristic cost from the same entry point to the end state 232. The planning component 108 may perform similar or identical computations for each of the entry states 240, to determine the driving trajectory costs to the end state 232 through each respective entry states 240. The planning component 108 may then determine a lowest-cost driving trajectory between the state 238 and the end state 232, based on the entry point having the lowest sum of heuristic costs from the state 238 to the entry point from the same entry point to the end state 232.

Although in this example, the lowest-cost trajectory determination based on heuristic cost computations is described for a single state 238 to an end state 232 in the driving environment. In some examples, the planning component 108 may perform similar or identical computations to determine a lowest-cost driving trajectory from the current vehicle state to an end state. Additionally or alternatively, the lowest-cost trajectory determination described in FIG. 2 may be performed for any number of other states in the driving environment, including intermediate states corresponding to states/positions along the route and/or other potential states that may or may not be included in a driving trajectory. As noted above, the planning component 108 may determine multiple lowest-cost and/or optimal driving trajectories (e.g., taking into account alternative possible routes, the presence of dynamic objects and/or other obstacles, to generate backup driving trajectories for a vehicle safety system, etc.), during which it may be useful to evaluate the heuristic costs associated with many different positions, states, and/or regions in the environment, including various intermediate states along the route and/or other states that may potentially be on a driving trajectory.

Figure 3:
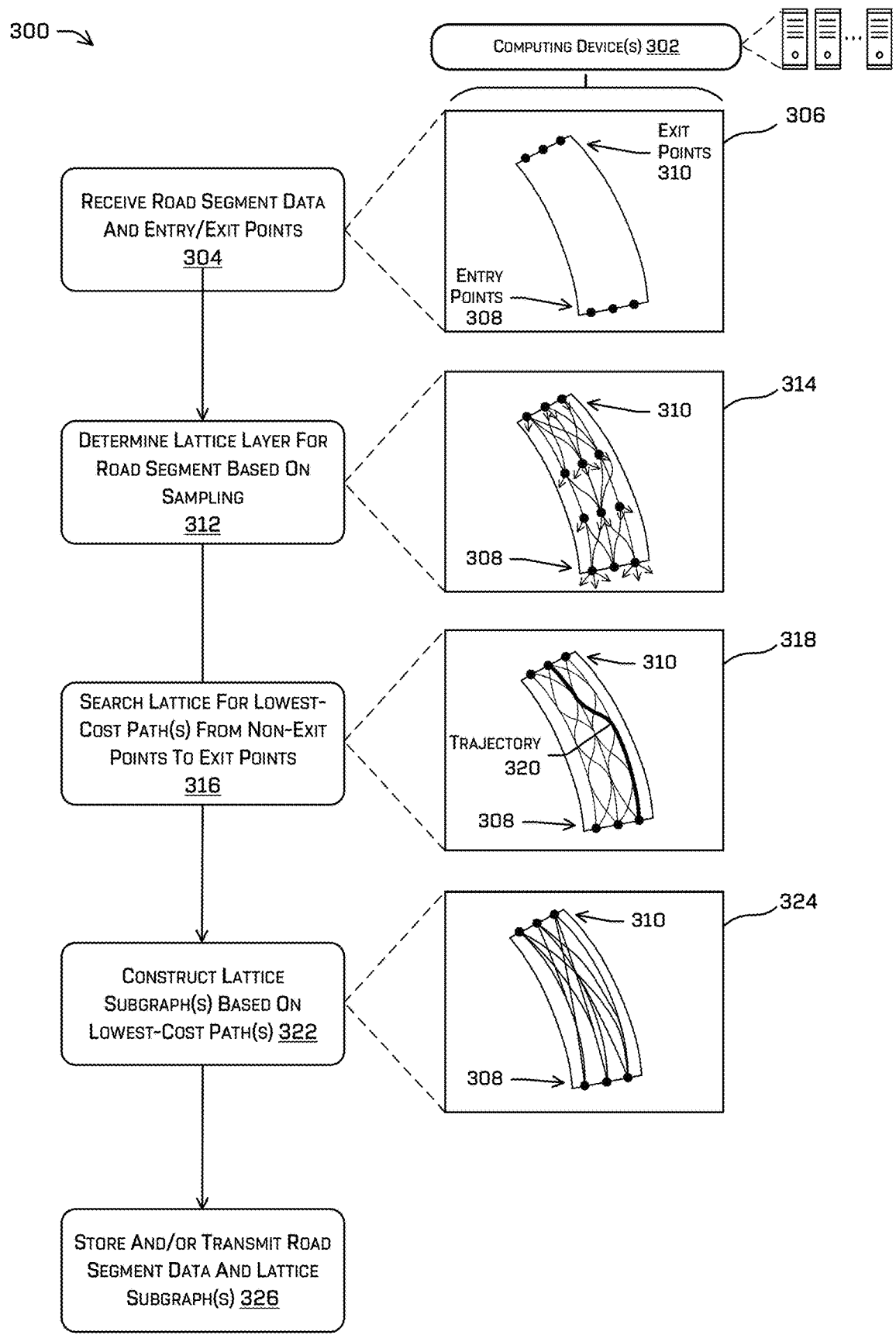
FIG. 3 illustrates an example technique for a computing device to determine a lattice subgraph based on heuristic costs associated with road segment(s) in a driving environment, in accordance with one or more examples of the disclosure.

FIG. 3 illustrates an example process 300 for determining lattice subgraphs based on the heuristic costs associated with road segment(s) in a driving environment. As described below, a number of lattice subgraphs may be precomputed on computing device(s) 302 that operate separately and independently from the autonomous vehicle 102. For example, computing device(s) 302 may use the techniques described herein to generate and efficiently group lattice subgraphs, using the map data and heuristics-based costs based on the kino-dynamic feasibility of the vehicle, safety and passenger comfort, driving policies, etc. The lattice subgraphs then may be provided to one or more autonomous vehicles 102 (e.g., with map data and/or based on their locations in the environment), to be used in the determinations of lowest-cost driving trajectories performed on the vehicle in real-time (as described above in process 200). Additionally or alternatively, if a possible pair of a start and end states along which a vehicle may drive is known in advance by the computing device(s) 302, the computing device(s) 302 may precompute the heuristic costs for routes to the end offline, rather than having the vehicle compute the heuristic costs to the end state during online driving operations. The end states as described herein may refer to a final intended destination of a vehicle during a driving trip (e.g., a parking location or other stopping point) or may refer to an end state of a relatively short-term driving trajectory that progresses toward the vehicle's final intended destination. For instance, such end states may include a state corresponding to the center position of a lane on a highway or stretch of road, a state of a vehicle approaching, entering, or leaving an intersection, etc.

At operation 304, the computing device(s) 302 may receive (and/or determine) road segment data, including entry and exit points associated with the road segments. As discussed above, the road segment data may be included in the map data associated with the environment. In some cases, the road segments may include data identifying the entry points and exit points for each road segment. Additionally or alternatively, the computing device(s) 302 may receive road segment data without entry points and/or exit points, and may determine the sets of entry points and exit points to use for constructing a lattice subgraph associated with the road segment.

In some examples, the computing device(s) 302 may determine the road segments and/or the entry and exit points so that road segments are adjacent and contiguous but not overlapping with other road segments, and arranged so that the entry states of each road segment are co-located and/or are identical vehicle states as the exit states of the adjacent road segment, and vice versa. When determining the numbers and configurations of entry and exit points associated with road segments, the computing device(s) 302 may determine the entry and exit points based on the desired tradeoff between the computational resources required to determine the lowest-cost driving trajectories (both on the computing device(s) 302 and on the autonomous vehicle 102 in real-time driving), and the quality of the determined lowest-cost driving trajectory.

Box 306 depicts an example of a road segment representing a curved portion of a lane within a roadway, including a set of entry points 308 at the start of the road segment and a set of exit points 310 at the end of the road segment. As described in the operations below, the computing device(s) 302 may initially determine a lattice layer, and then may determine a lattice subgraph based on the road segment in 306.

At operation 312, the computing device(s) 302 may determine the lattice layer for the road segment, using sampling (and/or other techniques). The initial lattice layer constructed in operation 312 may include a network of nodes and edges. The nodes in a lattice layer may include longitudinal and/or lateral sampled points and/or states within the road segment, and edges may include motion primitives between the possible node states. For instance, the plurality of nodes in a lattice layer may include nodes that are displaced along the road segment at various offsets from a center line of the road segment. As shown in box 314, to construct the initial lattice layer, the computing device(s) 302 may use lateral and/or longitudinal sampling and may solve optimal control problems to find kino-dynamically feasible motion primitives connecting possible node state (pairs). In some cases, different sets of kinematically feasible movements may be associated with different types (e.g., models) of vehicles. In this example, box 314 depicts the road segment including a number of positions (represented as dots) and a number of headings associated with each position (represented as arrows). A sampled state may correspond to a combination of a position and a heading, and motion primitives (represented as straight and/or curved line segments) are identified as connecting a pairs of sampled states. Although only a few examples of positions, headings, and motion primitives are shown in this example so as not to obscure the figure, it can be understood that the computing device(s) 302 may use these techniques to determine a lattice layer including any number of nodes (as sampled states including positions and headings) and edges (as motion primitives connecting nodes).

At operation 316, after the construction of the lattice layer, the computing device(s) 302 may search the lattice layer to determine one or more paths between each entry point 308 and each exit point 310. For example, the computing device(s) 302 may identify lowest-cost paths from each non-exit point in the lattice layer to each exit point 310 in the road segment. In some examples, the computing device(s) 302 may execute a graph search (e.g., Dijkstra search), applied backward from the exit points 310 on the lattice conformed to the road segment, to determine lowest cost paths from every non-exit point in the road segment to each exit point. After executing a Dijkstra search to explore every non-exit point which includes an entry point, lowest-cost paths from each entry point 308 to each exit point 310 may be determined. As shown in box 318, the lattice determined in operation 312 may be reused, including the lowest-cost transitions and the corresponding controls, to determine a lowest-cost trajectory 320 between a first entry point and first exit point. A similar or identical technique may be applied to determine the lowest-cost trajectory and controls from each entry point 308 to each exit point 310.

At operation 322, the computing device(s) 302 may construct a more sparse lattice subgraph representation of the road segment. The lattice subgraph determined in operation 322 may be a higher-layer graph representation than the initial lattice layer, including a set of nodes consisting of only the predetermined entry points 308 and exit points 310, and the corresponding edges defining the lowest-cost paths between each entry point and each exit point. As shown in box 324, the lattice subgraph in this example may be an individual lattice subgraph representing a single road segment. However, as described below in more detail in FIGS. 4A-4E, the computing device(s) 302 may construct lattice subgraphs based on groups of adjacent road segments. In such examples, a grouped lattice subgraph may correspond to any number of individual road segment lattice graphs, and the grouped lattice subgraphs may exclude the intermediate points, having as nodes only the entry points and exit points for the grouped lattice subgraph (e.g., not entry and exit points of the individual lattice subgraphs), and the edges defining the lowest-cost paths between the entry points and exit points. In some examples, the computing device(s) 302 may construct multiple different and/or overlapping lattice subgraphs, such as a lattice subgraphs associated with a first road segment, a separate lattice subgraph associated with a lateral grouping of the first road segment with one or more additional side-by-side road segments, another separate lattice subgraph associated with a longitudinal grouping of the first road segment with one or more additional longitudinally adject road segments in the same driving lane, and so on.

For both the determination of the initial lattice layer (operation 312) and the determination of the lattice subgraph(s) based on the initial lattice layer (operations 316 and 322), the computing device(s) 302 may perform the searching operations based on Dijkstra search, D*, D*lite, Focused Dynamic A*, A*, LPA*, and/or other graph search algorithms, etc., which may be applied on every exit points backward to determine the lowest-cost paths from the nodes to the exit point in the lattice. In some examples, the search may be based at least in part on constructing a directed graph based at least in part on the nodes and a ruleset. For example, the ruleset may specify that no two nodes of a same layer may be connected and/or minimum and/or maximum distance between connected nodes (e.g., the distance may be based at least in part on a maximum length of the set of motion primitives) and/or the like.

For example, to determine a lattice subgraph based on a single road segment or combination of road segments, the initial lattice layer(s) may be reused, and each search may start from a particular exit point, and using lateral and/or longitudinal sampling, may search for a trajectory to a particular entry point. The search may comprise iteratively identifying a lattice node that is as-of-yet unconnected (e.g., based at least in part on determining that the node is connectable to a last node that was added to the trajectory by the search (which may be a start node or end node if the search has just begun), and/or associated with a first cost in the cost plot, where the first cost may be less than a threshold cost and/or a minimum cost compared to the other nodes of the next layer), identifying a motion primitive associated with the node, and adding the node and motion primitive to the trajectory if the motion primitive is associated with a second cost that is less than a cost threshold. Once a contiguous set of such connections are identified the contiguous set may be output as a trajectory (e.g., trajectory 320). In some examples, the search may determine multiple trajectories and select the trajectory 320 from among the multiple trajectories based at least in part on the trajectory 320 having the shortest total length and/or the minimum total cost compared to the other trajectories. In an additional or alternate example, the search may be configured to guarantee that the search has found a cheapest and/or shortest trajectory, if one exists. As discussed above, when generating and evaluating trajectories in operation 316, and searching for a minimum cost trajectory, the computing device(s) may use heuristic costs based on the kino-dynamic feasibility of the vehicle, and/or any number of cost-based driving policies related to trajectory efficiency, driving safety, passenger comfort, etc.

In additional and/or alternate examples, the search performed in operation 316 may determine whether multiple homotopic groups exist among multiple trajectories generated by the search. For example, this may comprise a clustering algorithm, which may be machine learned in some examples; determining a distance between the trajectories and determining whether the distance is less than a threshold (same group) or whether the distance meets or exceeds the distance threshold (different group). Regardless of how the groups are identified, the search may select a primary trajectory from a first group and p contingent trajectories from the remaining q number of groups, where p and q are positive integers and p≤q. In some examples, the search may select a trajectory from p+1 or q+1 groups and select one trajectory from each of the groups based at least in part on determining a total cost associated with each of the trajectories.

For example, the trajectory selected for a group may be associated with a total cost that is a minimum total cost compared to the other trajectories of the group. The search may select, from among the multiple trajectories selected from the groups, a primary trajectory based at least in part on a total cost associated with the primary trajectory being a minimum total cost compared to the total costs associated with the multiple trajectories. For example, trajectory 320 may have been selected from a first group and a contingent trajectory may be selected from a second group. Trajectory 320 may have been selected as the primary trajectory based at least in part on a first total cost associated with trajectory 320 and a second total cost associated with the contingent trajectory. Additionally, it can be understood from this description that because lowest-cost trajectories may be precomputed and/or may be computed on remote computing devices separate from the autonomous vehicle, larger amounts of computing resources may be utilized to determine more optimal lowest-cost trajectories for the lattice subgraphs.

Although box 318 depicts a single trajectory 320 that has been determined for a single entry point-exit point combination, operation 316 may include determining lowest-cost trajectories for each combination of entry points and exit points defined for the road segment. As noted above, the techniques described in process 300 may be performed similarly or identically for groups of adjacent road segments. In such examples, the computing device(s) 302 may determine a grouping of laterally and/or longitudinally connected road segments, may determine the identical/co-located entry and exit states for grouping the connected road segments (in operation 312), and may determine lowest-cost trajectories (in operation 316) through the grouping of connected road segments (e.g., between each combination of entry and exit points for the grouping as a whole).

At operation 326, the computing device(s) 302 may store the lattice subgraph determined for the associated road segment (or grouping of road segments) in operation 322, and/or transmit the lattice subgraph to one or more autonomous vehicles 102. In some examples, the lattice subgraphs may be stored associated with map data (e.g., a map data server and/or road network database), and the map data, road segment data, lattice subgraphs, etc., can be transmitted over a wireless network to vehicles that approach the particular road segments.

As noted above, the lattice subgraphs generated by the computing devices(s) 302 may be based on (among other factors) the kino-dynamic attributes of the autonomous vehicle 102. Accordingly, the computing devices(s) 302 may generate different lattice subgraphs for different vehicle types (e.g., vehicle models), each of which may correspond to the same road segments and/or locations in the driving environment. Additionally or alternatively, the computing devices(s) 302 may generate different lattice subgraphs that can be transmitted to vehicles based on different driving conditions (e.g., weather conditions, traffic conditions, times of day, etc.).

FIGS. 4A-4E depict several examples of lattice subgraphs that may be constructed by the computing device(s) 302. As discussed above, each lattice subgraph may store one or more heuristic costs for each combination of entry points and exit points, where each heuristic cost represents the cost associated with controlling the vehicle between a particular entry point and a particular exit point. The lattice subgraphs shown in FIGS. 4A-4E may be precomputed by the computing device(s) 302, operating separately and independently from the autonomous vehicle 102, and then may be provided to the autonomous vehicle 102 (e.g., with a lane graph and/or additional map data) based on the location of the autonomous vehicle 102 in the environment. In the examples shown in FIGS. 4A-4E, the lattice subgraphs are depicted as top-down lattice views for clarity. However, lattices as described herein may include not only spatial dimensions (e.g., position, heading, curvature), but additionally or alternatively may be defined using temporal dimensions (e.g., velocity, acceleration, etc.).

In some examples, each lattice subgraph shown in FIGS. 4A-4E may represent a single instance of a lattice subgraph constructed by computing device(s) 302. Accordingly, each lattice subgraph in FIGS. 4A-4E may include a sparse lattice in which some or all of the intermediate states (depicted as hollow circles) have been removed, and the lattice subgraph includes only the transitions between each entry point and each exit point (depicted as filled circles) and the associated transition costs. As described cases, in such cases the computing device(s) 302 may construct a single lattice subgraph based on the lattices from a combination of multiple adjacent lane segments.

In other examples, the computing device(s) 302 may construct an individual lattice subgraph for each individual lane segment, and the planning component 108 may determine the entry and exit point costs using dynamic programming in the first computational stage. Thus, in other examples, each of FIGS. 4A-4E may be provided to the planning component 108 as combinations of multiple adjacent lattice subgraphs.

The computing device(s) 302 may be configured to construct lattice subgraphs by grouping certain arrangements of lane segments but not others. As an example, the computing device(s) 302 may construct a number of lattice subgraphs in a driving environment but combining all laterally adjacent (e.g., side-by-side) lane segments, but may use different lattice subgraphs for longitudinally adjacent lane segments. For instance, referring again to box 222, the computing device(s) 302 may construct a first lattice subgraph for road segment 224, a second lattice subgraph that combines road segments 226 and 228, and a third lattice subgraph for road segment 230. Such techniques may provide improved efficiency for the on-vehicle dynamic programming, while allowing connected paths (e.g., lane changes) through the route.

The lattice subgraphs depicted in FIGS. 4A-4E may be generated by the computing device(s) 302, using techniques similar or identical to those described in process 300. Lattice subgraphs, generated using search and/or cost optimization techniques based on heuristic costs, may be associated with individual road segments and/or groupings of adjacent road segments. In some examples, the generation of lattice subgraphs by the computing device(s) 302 may include an initial step of constructing a search space for a given operating road network. A search space may be represented as a two-level (or multi-channel) graph of a road network database, including a lane graph and a corresponding lattice graph. The lane graph may include a set of non-overlapping road segments (e.g., lane segments) and a number of connections between adjacent road segments. Road segment connections may include continuous (e.g., on the longitudinal edge and within the same driving lane), or lane-change (e.g., on the lateral edge connecting separate adjacent driving lanes).

FIG. 4A depicts a first example lattice subgraph 402 corresponding to multiple lane segments within the same lane. In this example, the lattice subgraph 402 includes a set of entry points 404 and a set of exit points 406. Within the lattice subgraph 402, transition costs may be computed from each of the entry points 404 to each of the exit points 406. The lattice states computed for the points (e.g., positions, poses, temporal state data) of the lattice subgraph may include the heuristic costs associated with the points and/or the vehicle controls associated with controlling the vehicle from the point to an exit point 406. As shown in this example, the heuristic costs associated with intermediate points within a road segment may be included within a lattice graph representing a lowest lattice layer, but might not be included in the more sparse lattice subgraphs (e.g., lattice subgraphs 402), which may providing improved efficiency for the vehicle when performing dynamic programming to determine lowest-cost trajectories through a grouping of adjacent lattice subgraphs.

FIG. 4B depicts a second example lattice subgraph 408 corresponding to a lane change connection between side-by-side lanes. In this example, the lattice subgraph 408 includes a set of entry points 410 in the originating left-side lane and a set of exit points 412 in the target right-side lane. The lattice controls for a lane change connection may be generated by connecting a state in the originating lane with another state in the target lane. These controls may cross over the lateral border between the two lanes. However, in some cases, lattice controls for a lane change connection may be prohibited from crossing over the longitudinal lane borders of the lattice subgraph 408. The computing device(s) 302 may determine weights associated with lattice controls, for example, by combining traveling time and curvature integration (and/or other terms).

By combining the lattice controls for continuous lattice connections and lane-change lattice connections, the computing device(s) 302 may construct a lattice graph that conforms to any desired road space. In some examples, the computing device(s) 302 may use various computational techniques to determine heuristics costs for grouped lattice subgraphs. For instance, the computing device(s) 302 may initially map a group of lattices associated with adjacent road segments, based on the entry and exit points of the lattices. To group continuous lattices within a driving lane, constructing the lattice group may include longitudinally mapping the entry and exit points of the inbound/outbound road segments. To group side-by-side lattices in adjacent lanes, constructing the lattice group may include laterally mapping the entry and exit points of a lane-change connection. For a resulting lattice group, the exit points may be those of the target lane(s), and the entry points may be those of the originating lane(s). The lattice group may include all the lattices generated within the target lane, within the originating lane, and/or lane changing trajectories between the lanes.

Figure 4C:
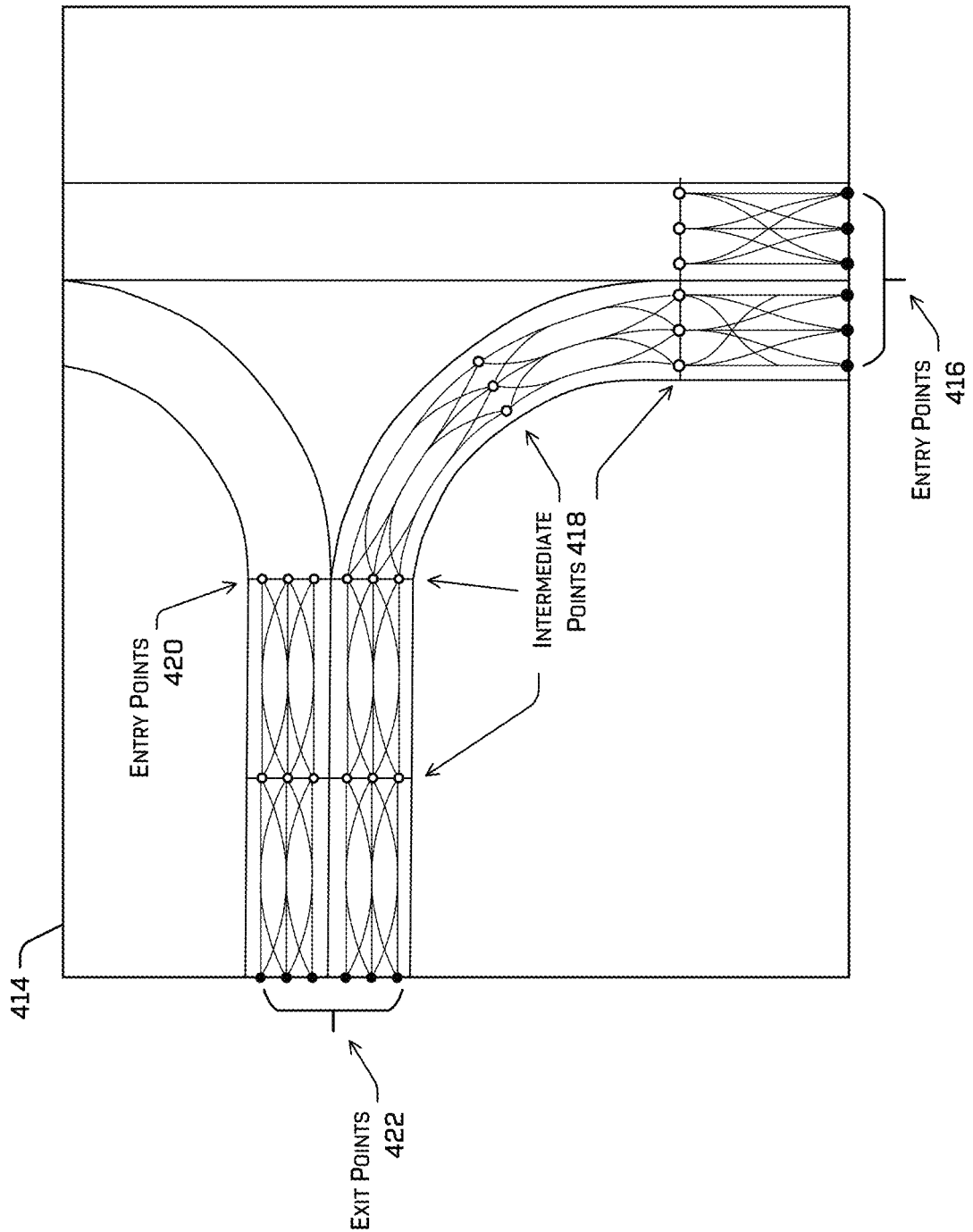

After initially mapping a group of lattices using the entry and exit points, the computing device(s) 302 may determine optimal trajectory costs on the grouped lattice subgraph (e.g., using the states within the grouped lattice and the corresponding vehicle controls) to determine the lowest-cost (e.g., shortest) trajectory between any pair of reachable states in the grouped lattice. For example, FIG. 4C depicts a more complex grouped lattice subgraph 414 including more road segments and representing a larger portion of the driving environment. In this example, a number of individual road segment lattices have been grouped by mapping the entry and exit points to form the lattice subgraph 414. The lattice subgraph 414 includes a first set of entry points 416, a second set of entry points 420 (e.g., due to a new lane joining the route), and a set of exit points 422 corresponding to the end of the grouped lattice subgraph 414. The computing device(s) 302 may use dynamic programming with heuristics computations to determine the lowest cost trajectory between each possible combination of the entry points and exit points.

Additionally, this example depicts a number of intermediate points 418 within the grouped lattice subgraph 414. For instance, the intermediate points 418 may represent the entry and/or exit points of the individual lattice subgraphs that were used to construct the grouped lattice subgraph 414. As noted above, the computing device(s) 302 may determine the lowest cost trajectories associated with each intermediate points 418 during the process of determine lowest cost trajectories through the grouped lattice subgraph 414, but may exclude the transitions and costs of the intermediate points 418 from the final grouped lattice subgraph 414. To determine a heuristics computation between the pairs of possible entry and exit states the computing device(s) 302 may construct one or more intermediate layer graphs that includes the intermediate points 418 representing the lowest-cost and/or optimal trajectories determined for the individual lattice subgraphs within the grouped lattice subgraph 414, and excluding the other non-optimal trajectories. As a result, the combined lattice for the grouped lattice subgraph 414 is more sparse than the original lattice graph for the environment (e.g., the lattice graph including all possible trajectories between each entry and exit state) without losing path optimality between the entry points and exit points (and/or intermediate points).

Using sparse grouped lattice subgraph 414, the planning component 108 may apply a graph search algorithm (e.g., Dijkstra's algorithm) backward from each exit points to the entry points (and/or intermediate points) during which the entry points (and/or intermediate points) can be updated with optimal costs (e.g., using Bellman's principle of optimality). This process can be performed more quickly while exploring fewer nodes, as compared to similar search processes that may be performed on the more dense original lattice graph. Thus, the autonomous vehicle 102 may reuse the results of the precomputed grouped lattice subgraph 414 during real-time navigation, to determine the heuristic costs and vehicle controls associated with the additional states (e.g., corresponding to non-entry points and non-exit point positions, etc.) not represented in the lattice subgraph. This technique reduces the costs and complexity of the heuristic computations performed on-vehicle during real-time navigation, and also allows the costs and controls for various states to be computed in parallel on the GPU of the autonomous vehicle 102, further reducing computation time.

Figure 4E:
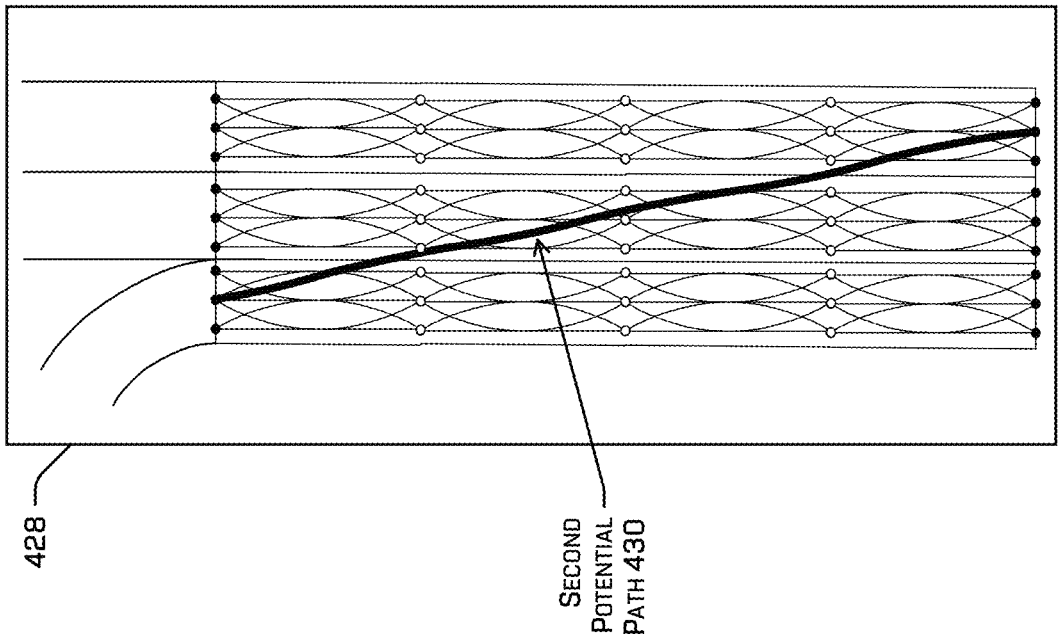
Figure 4D:
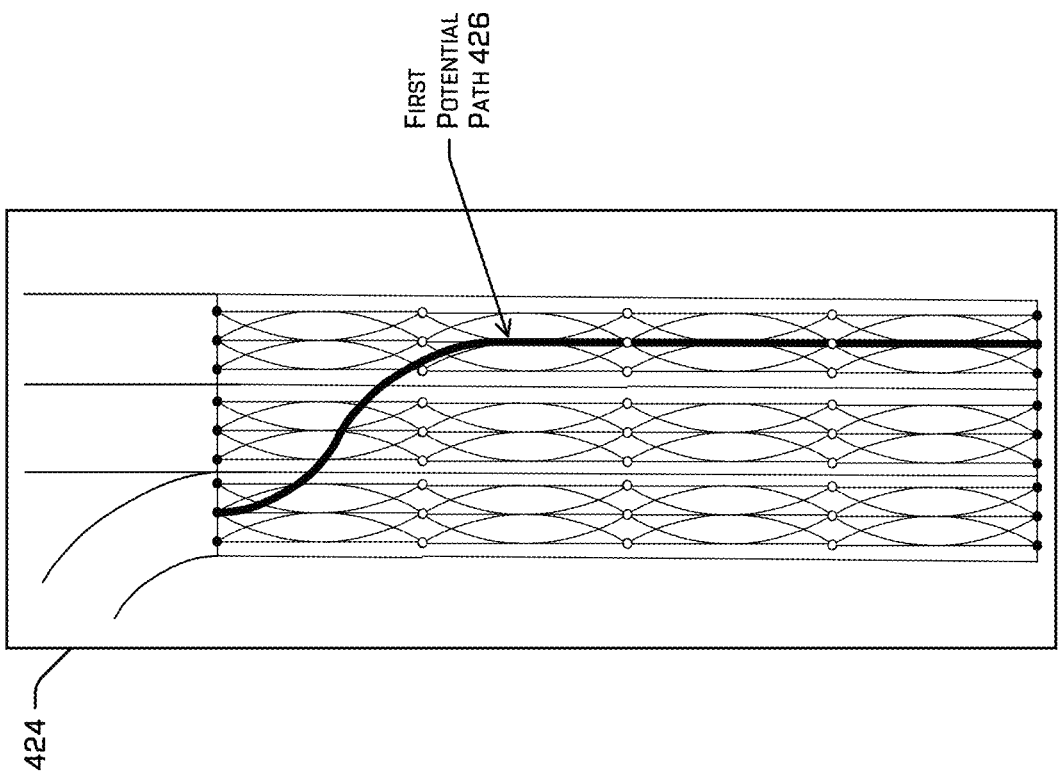

When computing the heuristic costs and vehicle controls associated with the various states in the lattice subgraph 414, the computing device(s) 302 may execute various optimization searches based on costs (e.g., driving comfort costs, route progress costs, travel efficiency costs, etc.) and the kino-dynamic feasibility of the vehicle and/or any number of cost-based driving policies related to path efficiency, driving safety, passenger comfort, etc. For instance, the computing device(s) 302 may use weights in the heuristic cost computations to implement policies to encourage or discourage certain driving behaviors. As an example, FIG. 4D depicts another grouped lattice subgraph 424 including a first potential driving trajectory 426 from an entry point to an exit point within the lattice subgraph 424. In this example, the computing device(s) 302 may compute the potential driving trajectory 426 as an optimal (e.g., lowest cost) trajectory based on the kino-dynamic feasibility of the vehicle, costs, driving efficiency metrics, etc. However, to implement a policy to encourage earlier lane changing by the vehicle, the computing device(s) 302 may impose a lane-ending penalty on the controls close to the end of a lane. In such cases, the computing device(s) 302 may apply a modified weight that results in a different optimal trajectory in which late lane changes before ending lanes are less likely to occur. For instance, FIG. 4E depicts another grouped lattice subgraph 428 identical to the lattice subgraph 424. In this example, based on the modified weight to encourage earlier lane changing, a second potential driving trajectory 430 has been determined as the optimal (e.g., lowest cost) trajectory from the entry point to the exit point.

Figure 5:
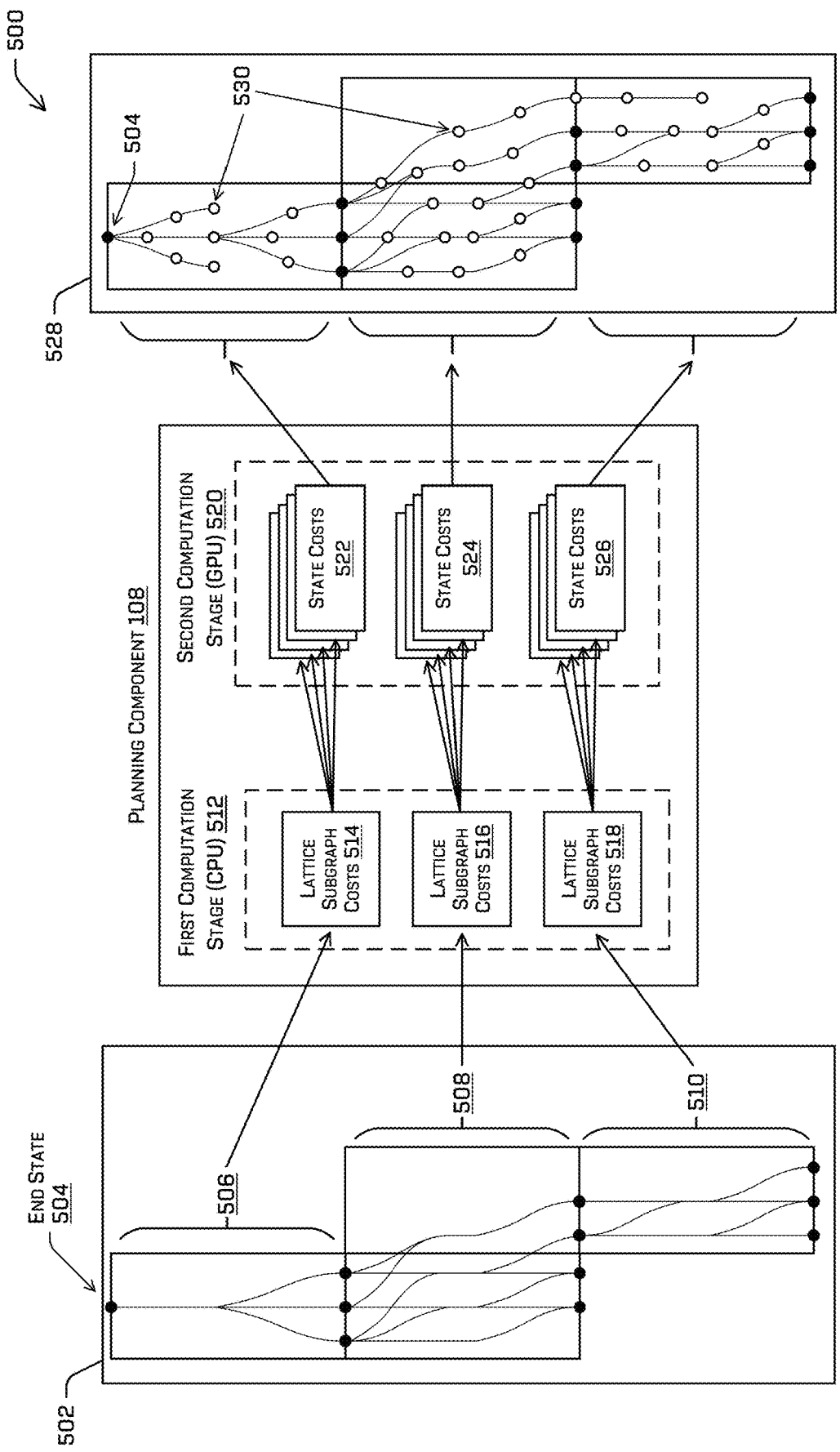
FIG. 5 illustrates an example technique for determining costs associated with various states relative to an end state in a route, in accordance with one or more examples of the disclosure.

FIG. 5 illustrates an example technique in which a trajectory planner of an autonomous vehicle (e.g., planning component 108) performs computations to determine the heuristic costs and/or vehicle controls associated with various states in a lattice graph. As described above, once the end position is determined, the planning component 108 may compute the route in the form of a lane graph consisting of the minimal set of connected lane segments starting from the current vehicle position and ending to the end position. The autonomous vehicle 102 may receive the lane graph and the precomputed lattices and subgraphs associated with each lane segment of the graph 502 from computing device(s) 302 operating separately from the vehicle. The graph 502 received by the autonomous vehicle 102 may consists of the entry and exit points as nodes, and the precomputed low-cost paths between each possible pair of entry and exit points as edges. That is, the sparse lattice that includes heuristic costs and/or controls for a reduced number of states (e.g., entry point states, exit point states) for each of the three lattice subgraphs in the graph 502, but need not include all intermediate states in the original lattice graphs.

In this example, the graph 502 is a combination of three separate and adjacent lattice subgraphs. The graph 502 may be received by the autonomous vehicle 102 as a single connected graph, or may be received as separate lattice subgraphs and connected by the vehicle by mapping the co-located entry and exit points. The first lattice subgraph 506 corresponds to a top section of the graph 502 (e.g., closest to the end state 504), the second lattice subgraph 508 corresponds to a middle section of the graph 502, and the third lattice subgraph 510 corresponds to a bottom portion of the graph 502 (e.g., closest to the current position of the vehicle).

When the graph 502 is received (and/or assembled) by the autonomous vehicle 102, the planning component 108 may perform a two-stage computational process to compute the heuristic costs and controls associated with various states in the graph 502, relative to the end state 504 (e.g., an intended destination of the vehicle). In the first computational stage 512, the planning component 108 may compute the heuristic costs associated with the entry points (and/or exit points or certain intermediate points) for each of the grouped lattice subgraphs, relative to the end state 504. In some examples, the planning component 108 may use CPU(s) of the autonomous vehicle 102 to perform the first computational stage 512. During the first computational stage 512, the planning component 108 may compute heuristic costs for the points in the graph 502 relative to the end state 504, by beginning with the end state 504 and propagating costs backward (or down) through the grouped lattice subgraphs. For instance, the lattice subgraph costs 514 for the first lattice subgraph 506 may correspond to the same (or similar) costs as the heuristic costs precomputed off-vehicle. The lattice subgraph costs 516 for the second lattice subgraph 508 may be computed by combining (e.g., summing and optimizing for lowest-cost) the lattice subgraph costs 514, with the precomputed heuristic costs for the second lattice subgraph 508. The lattice subgraph costs 518 for the third lattice subgraph 510 may be computed by combining (e.g., summing) the lattice subgraph costs 516, with the precomputed heuristic costs for the third lattice subgraph 510 (and so on for additional downstream lattice subgraphs).

In the second computation stage 520, the planning component 108 may compute the heuristic costs and/or vehicle controls associated with additional states not represented in the graph 502. In some examples, the planning component 108 may perform the second computation stage 520 in parallel for the separate lattice subgraphs and/or for separate states, using different dedicated processes to concurrently compute heuristic costs for other states (e.g., non-entry point and non-exit point states) in the lattice subgraphs. As shown in this example, a first set of processes 522 (e.g., executed in parallel) may compute the heuristic costs and controls for various states within the first lattice subgraph 506, a second set of processes 524 may compute the heuristic costs and controls for various states within the second lattice subgraph 508, and a third set of processes 526 may compute the heuristic costs and controls for various states within the third lattice subgraph 510, and so on. Points 530 represent additional states (e.g., intermediate states, states within the interior of a lane segment, and/or any other non-entry and non-exit point). For points 530, the optimal transitions and costs are not represented in the graph 502 precomputed off-vehicle, and instead the heuristic costs and/or controls are computed on-vehicle in the second computation stage 520. That is, during the first computational stage, the CPU computes the lowest cost from each entry point to all possible exit points within the subgraphs. The edge costs within the lattice subgraphs 506, 508, and 510 are the precomputed costs (e.g., precomputed off-vehicle by the computing device(s) 302). If a particular end position 504 is known a priori, then both of graph 502 and graph 528 could be precomputed offline. However, if the end position 504 is dynamically determined while driving by the autonomous vehicle 102, then only the edge costs of sparse lattice subgraphs in graph 502 are precomputed offline. In these cases, the use of dynamic programming to propagating the edge costs to the entry points in the first processing stage, and the computation of the costs of intermediate states in the second computational state may be done online by the planning component 108.

As noted above, the first set of processes 522, the second set of processes 524, and the third set of processes 526 may be performed in parallel for the different subgraphs, rather than relying on sequential processing through the lattice subgraphs. As described below, in some examples the planning component 108 may use the GPU(s) of the autonomous vehicle 102 to perform the second computational stage 520 in parallel, further reducing the computation time required for the vehicle to compute heuristic costs and/or controls associated with the additional points 530 (e.g., any non-entry point and non-exit point) in the environment, by applying dynamic programming to reuse the precomputed lowest cost between non-exit point and exit points within lattices in combination with the heuristic costs on exit points computed in the first stage.

Figure 6:
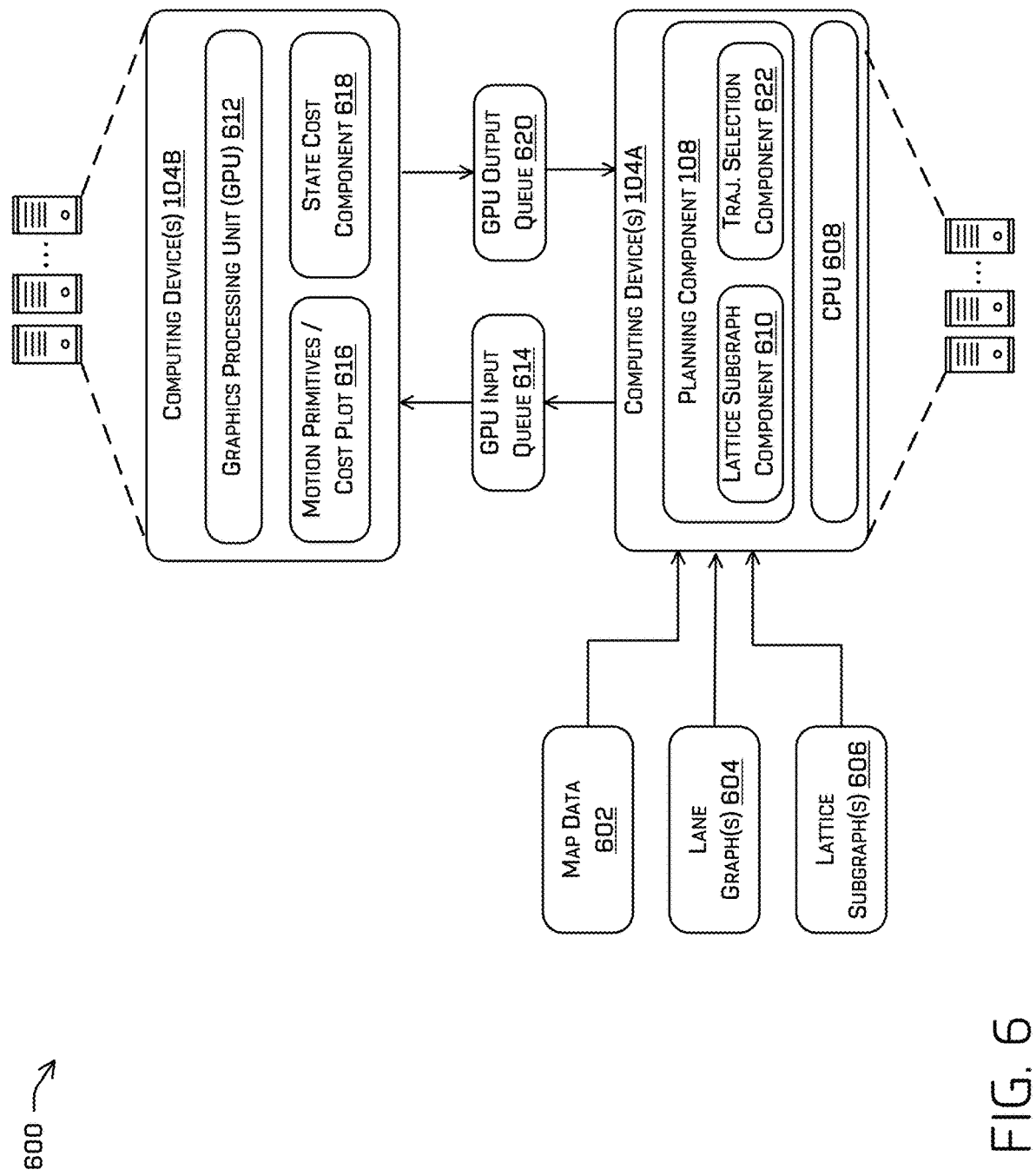
FIG. 6 illustrates an example system including multiple computing devices (e.g., a CPU and a GPU) configured to compute costs associated with various states relative to an end state in a route, in accordance with one or more examples of the disclosure.

FIG. 6 illustrates an example system 600 including multiple computing devices (e.g., a CPU and a GPU) and components configured to compute heuristic costs associated with various states when determining driving trajectories to an end state in an environment. In this example, computing devices 104A and 104B (which may be referred individually or collectively as computing device(s) 104) may represent computing devices within an autonomous vehicle 102. As described above, the computing device(s) 104 may be configured to determine driving trajectories for the vehicle along designated routes from an initial location toward a destination in a driving environment. In various examples, one or more computing device(s) 104 may include a planning component 108 configured to receive map data 602, one or more lane graph(s) 604, and/or one or more lattice subgraphs 606 for the environment in which the vehicle is currently operating. The map data 602, lane graph(s) 604, and/or lattice subgraphs 606 may be stored by one or more remote systems (e.g., computing device(s) 302) and transmitted over wireless networks to the autonomous vehicle 102. For example, the lattice subgraphs 606 may represent the sparse lattice subgraphs and/or groupings or combinations of subgraphs (e.g., graph 502) that are precomputed on separate computing device(s) 302 and transmitted to the autonomous vehicle 102 for use in real-time trajectory planning and navigation.

As described above in FIG. 5, the planning component 108 may be configured to perform a multi-stage computational process including an initial first stage to determine heuristic costs associated with the states (e.g., entry and exit points) in the precomputed lattice subgraph(s) 606, and a second stage to determine heuristic costs of additional states not represented in the precomputed lattice subgraph(s) 606. In this example, the computing device(s) 104 may include a first computing device 104A, including a CPU 608, that is configured to perform the first computation stage 512 of the multi-stage computational process. For instance, the planning component 108 in computing device 104A includes a lattice subgraph component 610 configured to receive (and/or determine) precomputed lattice graphs, group the lattice graphs/subgraphs based on the current state of the vehicle and an intended destination (e.g., an end state), and determine the heuristic costs associated with the entry points (and/or exit points or certain intermediate points) for each of the grouped lattice subgraphs relative to the intended destination. For example, the lattice subgraph component 610 may compute heuristic costs for the points in a sparse precomputed lattice, beginning with the intended destination state and propagating costs backward toward the current vehicle state.

After the heuristic costs associated with the precomputed lattice points (e.g., the entry and exit points of the lattice subgraphs), the computing device(s) 104B may be configured to perform the second computation stage 520, in which the planning component 108 computes the heuristic costs and/or vehicle controls associated with additional states not represented in the sparse precomputed lattice. In this example, the computing device(s) 104B may store one or more motion primitives and/or cost plots 616, which may be used by the state cost component 618 to compute the heuristic costs and vehicle controls for various other states (e.g., non-entry point and non-exit point states) in the lattice subgraphs.

In some examples, the interpolation may be performed after computing all costs of the lattice states, as this approach may be more computationally efficient and practical (unless the base lattice is too sparse). In such cases, the cost plot may be used only when the query state is relatively far away from the lattice. As discussed above, the second computation stage may be performed in parallel for separate lattice subgraphs, and the computing device(s) 104B may include a GPU 612 to separately process the heuristic computations for the different lattice subgraphs along the route between the current vehicle state and the intended destination state.

In some examples, to concurrently compute the heuristic costs for the other states (e.g., non-entry point and non-exit point states) in the lattice subgraphs, the planning component 108 may provide each lattice subgraph and the associated heuristic costs determined for the subgraph by the lattice subgraph component 610, to the GPU input queue 614. The state cost component 618 may use the GPU 612 to execute dynamic programming on each subgraph, to determine the lowest-cost trajectories and controls associated with any number of potential vehicle states in the subgraph. When providing a subgraph to the GPU input queue 614, the computing device(s) 104 also may place one or more threads/processes related to the subgraph into an inactive state (e.g., sleeping), to be awoken upon receiving an indication that the requested subgraph search has been completed by the GPU 612. For instance, the computing device(s) 104 may implement one or more GPU/GPU fences and/or GPU/CPU fences to control the flow of searched lattice subgraphs through the processing pipeline described herein.

When a lattice subgraph is placed into the GPU input queue 614, the state cost component 618 may retrieve data associated with the searches to be performed on the lattice subgraph, and may provide the data (and/or the motion primitives and/or cost plots 616) to the GPU 612 on which the dynamic programming may be executed. After using the GPU 612 to perform the dynamic programming process on a lattice subgraph, determining the heuristic costs and/or controls for additional states within the lattice subgraph, the computing device(s) 104 may provide the updated lattice subgraph to the GPU output queue 620. When an updated lattice subgraph is placed into the GPU output queue 620, the computing device(s) 104 may initiate one or more post-processing components, such as the trajectory selection component 622 configured to determine one or more lowest-cost trajectories for the vehicle to follow through the environment, based on the heuristic costs within the updated lattice subgraphs. In some examples, the planning component 108 may use the trajectory selection component 622 to determine multiple lowest-cost and/or optimal driving trajectories, for instance, trajectories taking into account alternative possible routes, the presence of dynamic objects and/or other obstacles, backup driving trajectories for a vehicle safety system, etc.

In some examples, the planning component 108 may use separate threads to push lattice subgraph search tasks onto the GPU input queue 614, and additional separate threads to pull updated lattice graphs from the GPU output queue 620. As shown in this example, the computing device(s) 104 may be implemented as separate computing devices 104A and 104B operating within an autonomous vehicle 102. In other examples, one or both of the computing devices 104A and 104B may be implemented in separate computing environments and/or on separate networks. In some implementations, the CPU 608 may be configured to perform separate pre- and post-processing functionalities, such as lattice subgraph grouping, selection, scheduling, retrieval of updated lattice subgraphs (or heuristic costs/controls) from GPU output queues, etc. In these implementations, the computing devices 104 may monitor the speed, performance, capacity, and latencies associated with the respective tasks performed by the CPU 608 and GPU 612, in order to more efficiently manage the real-time determination of robust and optimal driving trajectories for autonomous vehicles.

Figure 7A:
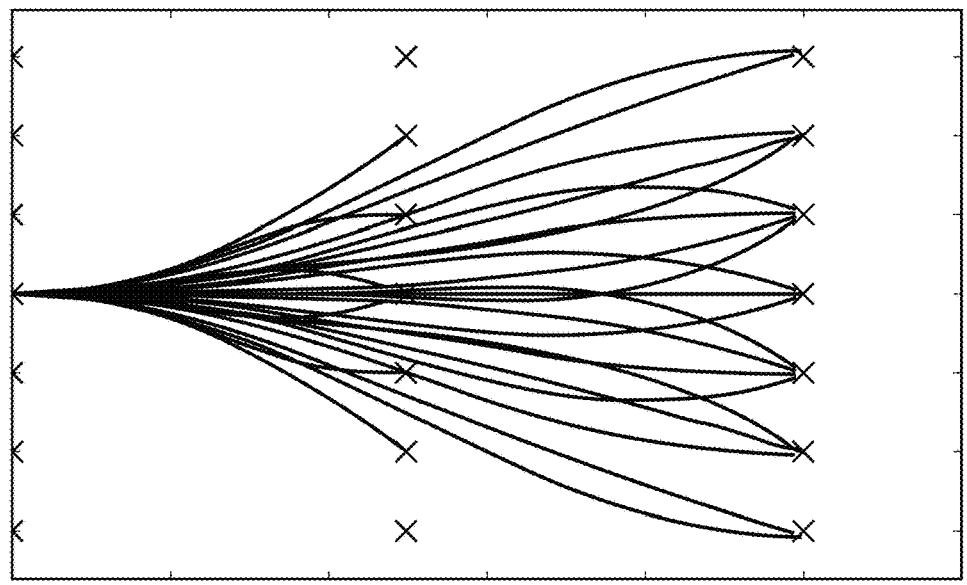
FIG. 7A illustrates an example set of motion primitives.
Figure 7B:
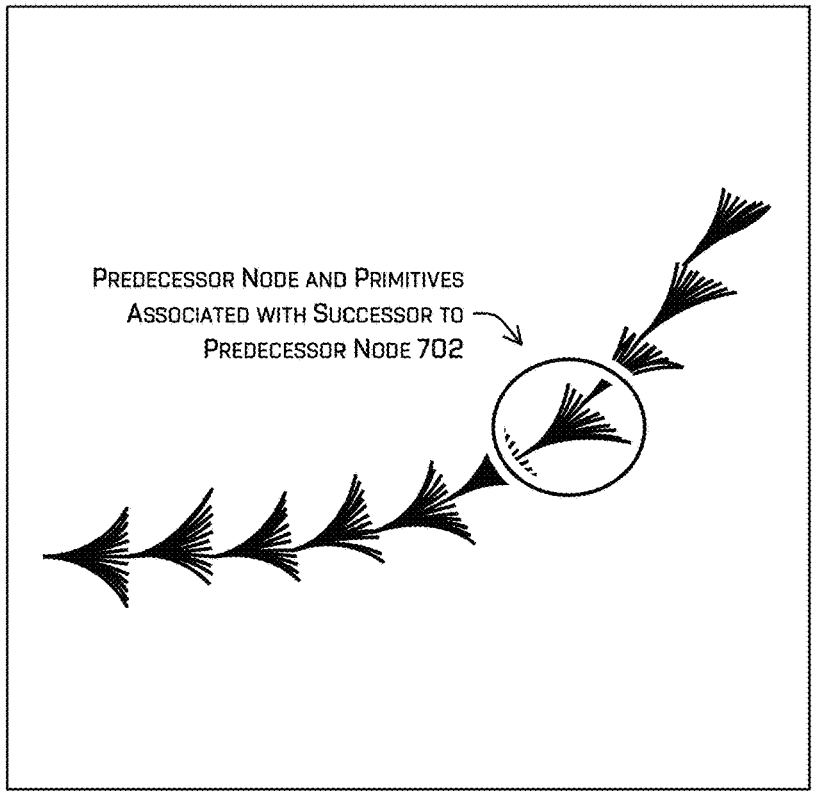
FIG. 7B illustrates an example directed graph and/or indication of successor nodes and respective motion primitives of predecessors selected by the search.

FIGS. 7A and 7B, discussed above in reference to FIG. 2, depict sets of motion primitives 700 representing kinodynamic feasible motions for an autonomous vehicle 102. As noted above, different motion primitives 700 representing the sets of kinematically feasible movements may be associated with different types (e.g., models) of vehicles. FIG. 7A depicts a first set of motion primitives 700. In some examples, the set may comprise hundreds or thousands of motion primitives, but the example depicted in FIG. 7A comprises tens of motion primitives 700 for the sake of clarity. In some examples, a motion primitive may be a representation of a feasible motion of a particular autonomous vehicle, such as a polynomial line, a cubic spiral, Bezier, clothoid, and/or the like. FIG. 7B depicts an example of a predecessor node and motion primitives associated with succors to the predecessor node of an r-th node in a trajectory (702). FIG. 7B includes such a depiction for each node/connection selected based at least in part on a search. Additional examples of motion primitives and various techniques for determining motion primitives associated with an autonomous vehicle 102 can be found, for example, in U.S. patent application Ser. No. 16/517,506, filed Jul. 19, 2019, and entitled "Unstructured Vehicle Path Planner," the entire contents of which are incorporated herein by reference in their entirety for all purposes.

Figure 8A:
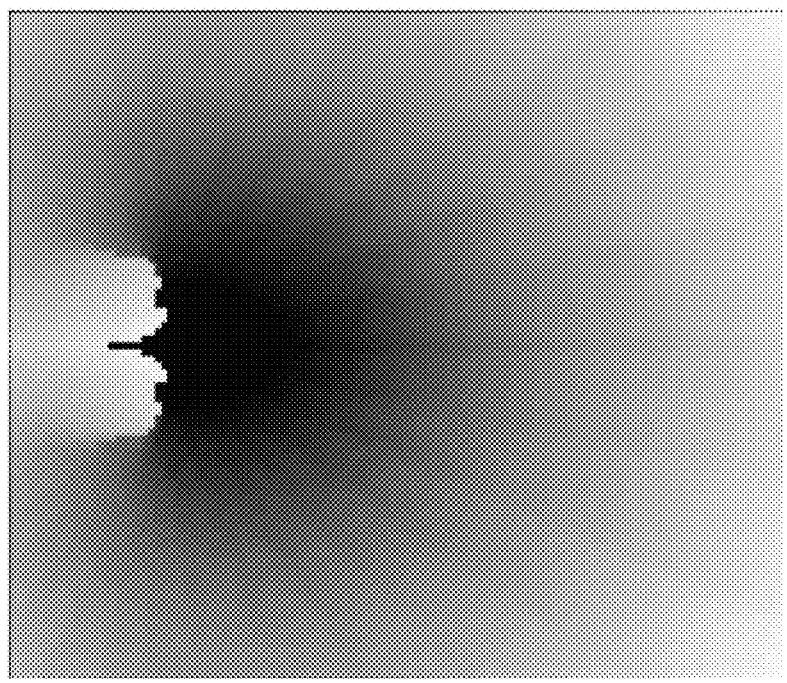
FIGS. 8A and 8B illustrate respective portions of an example cost plot.
Figure 8B:
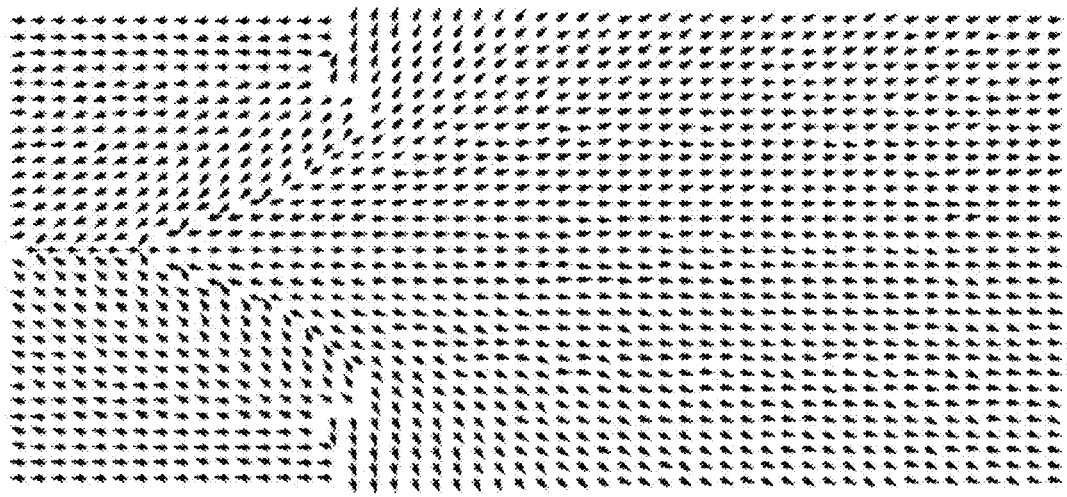

FIGS. 8A and 8B, discussed above in reference to FIG. 2, depict an example cost plot that may be used to compute heuristic costs associated with vehicle states in the environment. In FIG. 8A, cost plot 800A depicts cost values (darker shades indicate lower cost, lighter shades indicate higher cost) associated with x and y positions at the yaw positions specified by cost plot 800B, depicted in FIG. 8B, which may be the minimum cost yaw for each state/position in the depicted example. In various examples, such a cost plot may be associated with a heuristic cost, as specified above. As further described in detail herein, initial states corresponding to positions which lie outside such a cost plot may be estimated based on interpolations (or extrapolations) of the closest point or point in the cost plot.

Figure 9:
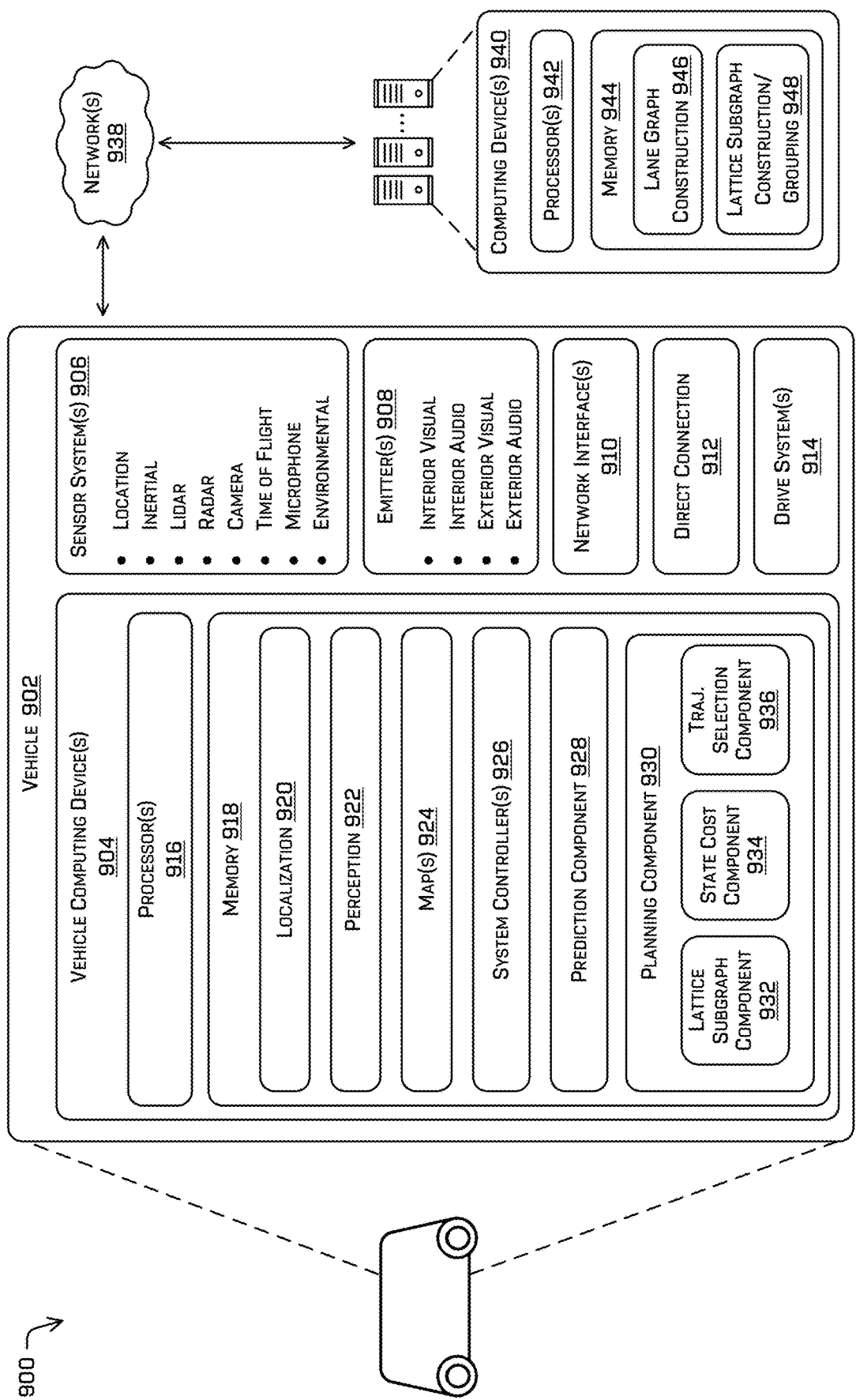
FIG. 9 is a block diagram illustrating an example system, including an autonomous vehicle and separate computing devices, for implementing various techniques described herein.

FIG. 9 is a block diagram of an example system 900 for implementing the techniques described herein. In at least one example, the system 900 may include a vehicle, such as vehicle 902. The vehicle 902 may include one or more vehicle computing devices 904, one or more sensor systems 906, one or more emitters 908, one or more network interfaces 910, at least one direct connection 912, and one or more drive systems 914.

The vehicle computing device 904 may include one or more processors 916 and memory 918 communicatively coupled with the processor(s) 916. In the illustrated example, the vehicle 902 is an autonomous vehicle; however, the vehicle 902 could be any other type of vehicle, such as a semi-autonomous vehicle, or any other system having driving trajectory planning/navigation functionality. In some instances, the autonomous vehicle 902 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 902 may be a fully or partially autonomous vehicle having any other level or classification.

In the illustrated example, the memory 918 of the vehicle computing device 904 stores a localization component 920, a perception component 922, one or more maps 924 (or map data 924), one or more system controllers 926, a prediction component 928, and a planning component 930 including a lattice subgraph component 932, a state cost component 934, and a trajectory selection component 936. Though depicted in FIG. 9 as residing in the memory 918 for illustrative purposes, it is contemplated that the localization component 920, the perception component 922, the maps 924, the system controllers 926, the prediction component 928, the planning component 930, the lattice subgraph component 932, the state cost component 934, and the trajectory selection component 936 may additionally, or alternatively, be accessible to the vehicle 902 (e.g., stored on, or otherwise accessible by, memory remote from the vehicle 902, such as, for example, memory 944 of one or more computing device(s) 940). In some examples, the memory 944 may include a lane graph constructor 946 and a lattice subgraph construction and grouping component 948.

In at least one example, the localization component 920 may include functionality to receive sensor data from the sensor system(s) 906 to determine a position and/or orientation of the vehicle 902 (e.g., one or more of an x-, y-, z-position, roll, pitch, or yaw). For example, the localization component 920 may include and/or request/receive a map of an environment, such as from map(s) 924, and may continuously determine a location and/or orientation of the vehicle 902 within the environment. In some instances, the localization component 920 may utilize SLAM (simultaneous localization and mapping), CLAMS (calibration, localization and mapping, simultaneously), relative SLAM, bundle adjustment, non-linear least squares optimization, or the like to receive image data, lidar data, radar data, inertial measurement unit (IMU) data, GPS data, wheel encoder data, and the like to accurately determine a location of the vehicle 902. In some instances, the localization component 920 may provide data to various components of the vehicle 902 to determine an initial position of the vehicle 902 for determining the relevance of an object to the vehicle 902, as discussed herein.

In some instances, the perception component 922 may include functionality to perform object detection, segmentation, and/or classification. In some examples, the perception component 922 may provide processed sensor data that indicates a presence of an object (e.g., entity) that is proximate to the vehicle 902 and/or a classification of the object as an object type (e.g., car, pedestrian, cyclist, animal, building, tree, road surface, curb, sidewalk, unknown, etc.). In some examples, the perception component 922 may provide processed sensor data that indicates a presence of a stationary entity that is proximate to the vehicle 902 and/or a classification of the stationary entity as a type (e.g., building, tree, road surface, curb, sidewalk, unknown, etc.). In additional or alternative examples, the perception component 922 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The memory 918 may further include one or more maps 924 that may be used by the vehicle 902 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 902 may be controlled based at least in part on the map(s) 924. That is, the map(s) 924 may be used in connection with the localization component 920, the perception component 722, the prediction component 928, and/or the planning component 930 to determine a location of the vehicle 902, detect objects in an environment, generate routes, determine actions and/or trajectories to navigate within an environment.

In some examples, the one or more maps 924 may be stored on a remote computing device(s) (such as the computing device(s) 940) accessible via network(s) 938. In some examples, multiple maps 924 may be stored based on, for example, a characteristic (e.g., type of entity, time of day, day of week, season of the year, etc.). Storing multiple maps 924 may have similar memory requirements, but increase the speed at which data in a map may be accessed.

In at least one example, the vehicle computing device 904 may include one or more system controllers 926, which may be configured to control steering, propulsion, braking, safety, emitters, communication, and other systems of the vehicle 902. The system controller(s) 926 may communicate with and/or control corresponding systems of the drive system(s) 914 and/or other components of the vehicle 902.

The prediction component 928 may generate one or more probability maps representing prediction probabilities of possible locations of one or more objects in an environment. For example, the prediction component 928 may generate one or more probability maps for vehicles, pedestrians, animals, and the like within a threshold distance from the vehicle 902. In some instances, the prediction component 928 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

In some examples, the prediction component 928 may generate predicted trajectories of objects (e.g., objects) in an environment. For example, the prediction component 928 may generate one or more predicted trajectories for objects within a threshold distance from the vehicle 902. In some examples, the prediction component 928 may measure a trace of an object and generate a trajectory for the object based on observed and predicted behavior.

In general, the planning component 930 may determine a trajectory for the vehicle 902 to follow to traverse through an environment. For example, the planning component 930 may determine various routes and trajectories and various levels of detail. For example, the planning component 930 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 930 may generate an instruction for guiding the vehicle 902 along at least a portion of the route from the first location to the second location. In at least one example, the planning component 930 may determine how to guide the vehicle 902 from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single trajectory of the multiple trajectories in a receding data horizon having the highest confidence level may be selected to operate the vehicle. In various examples, the planning component 930 may select a trajectory for the vehicle 902.

In other examples, the planning component 930 may alternatively, or additionally, use data from the localization component 920, the perception component 922, map(s) 924, and/or the prediction component 928 to determine a trajectory for the vehicle 902 to follow to traverse through an environment. For example, the planning component 930 may receive data (e.g., object data) from the localization component 920, the perception component 922, and/or the prediction component 928 regarding objects associated with an environment. In some examples, the planning component 930 receives data for relevant objects within the environment. Using this data, the planning component 930 may determine a route to travel from a first location (e.g., a current location) to a second location (e.g., a target location) to avoid objects in an environment. In at least some examples, such a planning component 930 may determine there is no such collision-free trajectory and, in turn, provide a trajectory that brings vehicle 902 to a safe stop avoiding all collisions and/or otherwise mitigating damage.

In some instances, aspects of some or all of the components discussed herein may include any models, techniques, and/or machine learned techniques. For example, in some instances, the components in the memory 918 (and the memory 944, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 906 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 906 may include multiple instances of each of these or other types of sensors. For instance, the lidar sensors may include individual lidar sensors located at the corners, front, back, sides, and/or top of the vehicle 902. As another example, the camera sensors may include multiple cameras disposed at various locations about the exterior and/or interior of the vehicle 902. The sensor system(s) 906 may provide input to the vehicle computing device 904. Additionally, or in the alternative, the sensor system(s) 906 may send sensor data, via the one or more networks 938, to the one or more computing device(s) 940 at a particular frequency, after a lapse of a predetermined period of time, in near real-time, etc.

The vehicle 902 may also include one or more emitters 908 for emitting light and/or sound. The emitter(s) 908 may include interior audio and visual emitters to communicate with passengers of the vehicle 902. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 908 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 902 may also include one or more network interfaces 910 (or communication connections) that enable communication between the vehicle 902 and one or more other local or remote computing device(s). For instance, the network interfaces 910 may facilitate communication with other local computing device(s) on the vehicle 902 and/or the drive system(s) 914. Also, the network interface(s) 910 may allow the vehicle to communicate with other nearby computing device(s) (e.g., computing device(s) 940, other nearby vehicles, etc.) and/or one or more remote sensor system(s) for receiving sensor data. The network interface(s) 910 also may enable the vehicle 902 to communicate with a remote teleoperations computing device or other remote services.

The network interface(s) 910 may include physical and/or logical interfaces for connecting the vehicle computing device 904 to another computing device or a network, such as network(s) 938. For example, the network interface(s) 910 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 902 may include one or more drive systems 914. In some examples, the vehicle 902 may have a single drive system 914. In at least one example, if the vehicle 902 has multiple drive systems 914, individual drive systems 914 may be positioned on opposite ends of the vehicle 902 (e.g., the front and the rear, etc.). In at least one example, the drive system(s) 914 may include one or more sensor systems to detect conditions of the drive system(s) 914 and/or the surroundings of the vehicle 902. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 914. In some cases, the sensor system(s) on the drive system(s) 914 may overlap or supplement corresponding systems of the vehicle 902 (e.g., sensor system(s) 906).

The drive system(s) 914 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 914 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 914. Furthermore, the drive system(s) 914 may also include one or more communication connection(s) that enable communication by the respective drive module with one or more other local or remote computing device(s).

In at least one example, the direct connection 912 may provide a physical interface to couple the one or more drive system(s) 914 with the body of the vehicle 902. For example, the direct connection 912 may allow the transfer of energy, fluids, air, data, etc. between the drive system(s) 914 and the vehicle. In some instances, the direct connection 912 may further releasably secure the drive system(s) 914 to the body of the vehicle 902.

In at least one example, the localization component 920, the perception component 922, the maps 924, the system controllers 926, the prediction component 928, the planning component 930, the lattice subgraph component 932, the state cost component 934, and the trajectory selection component 936 may process sensor data, as described above, and may send their respective outputs, over the one or more network(s) 938, to the computing device(s) 940. In at least one example, the localization component 920, the perception component 922, the maps 924, the system controllers 926, the prediction component 928, the planning component 930, the lattice subgraph component 932, the state cost component 934, and the trajectory selection component 936 may send their respective outputs to the computing device(s) 940 at a particular frequency, after a lapse of a predetermined period of time, in near real-time, etc.

In some examples, the vehicle 902 may send sensor data to the computing device(s) 940 via the network(s) 938. In some examples, the vehicle 902 may receive sensor data from the computing device(s) 940 and/or remote sensor system(s) via the network(s) 938. The sensor data may include raw sensor data and/or processed sensor data and/or representations of sensor data. In some examples, the sensor data (raw or processed) may be sent and/or received as one or more log files.

The computing device(s) 940 may include processor(s) 942 and a memory 944, which may include a lane graph constructor 946 and a lattice subgraph construction and grouping component 948. In some examples, the memory 944 may store one or more of components that are similar to the component(s) stored in the memory 918 of the vehicle 902. In such examples, the computing device(s) 940 may be configured to perform one or more of the processes described herein with respect to the vehicle 902. In some examples, the lane graph constructor 946 and a lattice subgraph construction and grouping component 948 perform substantially similar functions as the lattice subgraph component 932 and the state cost component 934.

The processor(s) 916 of the vehicle 902 and the processor(s) 942 of the computing device(s) 940 may be any suitable processor capable of executing instructions to process data and perform operations as described herein. By way of example and not limitation, the processor(s) may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 918 and memory 944 are examples of non-transitory computer-readable media. The memory 918 and memory 944 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 9 is illustrated as a distributed system, in alternative examples, components of the vehicle 902 may be associated with the computing device(s) 940 and/or components of the computing device(s) 940 may be associated with the vehicle 902. That is, the vehicle 902 may perform one or more of the functions associated with the computing device(s) 940, and vice versa.

The methods described herein represent sequences of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. In some examples, one or more operations of the method may be omitted entirely. For instance, the operations may include determining a first action and a second action by the vehicle relative to a selected trajectory without determining a respective cost for one or more of the actions by the vehicle. Moreover, the methods described herein may be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

EXAMPLE CLAUSES

A. A vehicle comprising: one or more processors; and one or more non-transitory computer-readable media storing computer-executable instructions that, when executed, cause the one or more processors to perform operations comprising: receiving a route associated with the vehicle, the route including a start state and an end state; determining, based at least in part on the route, a first road segment from a road network database, wherein the first road segment is associated with a first lattice graph comprising a first plurality of entry states, a first plurality of exit states, a first kinematically feasible transition between a first entry state of the first plurality of entry states and a first exit state of the first plurality of exit states, and a first cost associated with the first transition; determining, based at least in part on the route, a second road segment proximate the first road segment, wherein the second road segment is associated with a second lattice graph comprising a second plurality of entry states, a second plurality of exit states, a second kinematically feasible transition between a second entry state of the second plurality of entry states and a second exit state of the second plurality of exit states, and a second cost associated with the second transition, and wherein the second entry state is co-located with the first exit state; and controlling the vehicle based at least in part on the first cost and the second cost.

B. The vehicle of paragraph A, the operations further comprising: determining a current state of the vehicle; and selecting the first entry state from the first plurality of entry states in the first lattice graph, based at least in part on the current state of the vehicle.

C. The vehicle of paragraph A, the operations further comprising: determining a trajectory between the start state and the end state, wherein determining the trajectory comprises: determining, in a first computational stage and based at least in part on the first cost and the second cost, a third cost associated with controlling the vehicle between the first entry state of the first road segment and the end state; and determining, in a second computational stage performed after the first computational stage, and based at least in part on a cost plot, a fourth cost associated with controlling the vehicle between the start state and the first entry state of the first road segment; and controlling the vehicle base at least in part on the trajectory.

D. The vehicle of paragraph A, wherein the first computational stage comprises: determining the third cost associated with controlling the vehicle between the first entry state of the first road segment and the end state; and comparing the third cost to an alternative third cost associated with controlling the vehicle between the first entry state of the first road segment and the end state, wherein the alternative third cost is associated with a first alternative transition within the first lattice graph and a second alternative transition within the second lattice graph.

E. The vehicle of paragraph D, wherein the second computational stage comprises: determining the fourth cost associated with controlling the vehicle between the start state and the first entry state of the first road segment; and comparing the fourth cost to an alternative fourth cost associated with controlling the vehicle between the start state and the first entry state of the first road segment.

F. A method comprising: receiving a route associated with a vehicle in an environment, the route including a start state and an end state; determining, based at least in part on the route, a first road segment and a second road segment; receiving, by the vehicle, a first lattice subgraph associated with the first road segment, and a second lattice subgraph associated with the second road segment; determining, based at least in part on the first lattice subgraph, a first cost associated with controlling the vehicle between a first entry state of the first road segment and a first exit state of the first road segment; and determining, based at least in part on the second lattice subgraph, a second cost associated with controlling the vehicle between a second entry state of the second road segment and a second exit state of the second road segment, wherein the first exit state of the first road segment is co-located with the second entry state of the second road segment; determining, based at least in part on the first cost and the second cost, a third cost associated with controlling the vehicle between the first entry state of the first road segment and the end state; determining, based at least in part on a cost plot, a fourth cost associated with controlling the vehicle between the start state and the first entry state of the first road segment; determining, based at least in part on the third cost and the fourth cost, a trajectory between the start state and the end state; and controlling the vehicle based at least in part on the trajectory.

G. The method of paragraph F, further comprising: receiving, by the vehicle and via a wireless network, road segment data from a road network database, the road segment data including: a road graph associated with the route, wherein the road graph includes the first road segment and the second road segment; and a lattice graph associated with the road graph, the lattice graph including the first lattice subgraph associated with the first road segment and the second lattice subgraph associated with the second road segment.

H. The method of paragraph F, wherein determining the fourth cost comprises: determining, based at least in part on the cost plot and a set of potential motions, a trajectory segment between the start state and the first entry state of the first road segment, wherein the cost plot comprises a set of values indicative of costs to move from a range of positions and orientations to a desired position and orientation.

I. The method of paragraph F, wherein the first road segment includes the first entry state and a third entry state, and wherein determining the trajectory comprises: determining a first trajectory cost of a first trajectory between the start state and the end state, wherein the first trajectory is associated with the first entry state of the first road segment; determining a second trajectory cost of a second trajectory between the start state and the end state, wherein the second trajectory is associated with the third entry state of the first road segment; and determining, as the trajectory, the first trajectory, based at least in part on comparing the first trajectory cost to the second trajectory cost.

J. The method of paragraph I, wherein: the first road segment includes the first exit state and a third exit state; the first trajectory is associated with the first exit state of the first road segment; and the second trajectory is associated with the third exit state of the first road segment.

K. The method of paragraph F, wherein the first road segment and the second road segment are adjacent road segments of different driving lanes, and wherein the trajectory includes a lane change driving maneuver associated with the first exit state of the first road segment and the second entry state of the second road segment.

L. The method of paragraph F, wherein the start state is not within the first road segment or the second road segment, the method further comprising: determining an additional state within the first road segment; and determining a fifth cost associated with controlling the vehicle between the additional state within the first road segment and the first exit state of the first road segment, wherein the fifth cost is determined after determining the third cost.

M. The method of paragraph L, wherein: determining the fourth cost is performed by a first process executing on a graphics processing unit (GPU) on the vehicle; and determining the fifth cost is performed by a second process executing on the GPU, wherein the first process and the second process are executed in parallel.

N. The method of paragraph F, wherein: the first road segment includes a first plurality of entry states and a first plurality of exit states, and wherein the first lattice subgraph includes costs associated with controlling the vehicle from each of the first plurality of entry states to each of the first plurality of exit states; and the second road segment includes a second plurality of entry states and a second plurality of exit states, and wherein the second lattice subgraph includes costs associated with controlling the vehicle from each of the second plurality of entry states to each of the second plurality of exit states.

O. One or more non transitory computer readable media storing instructions executable by a processor, wherein the instructions, when executed, cause the processor to perform operations comprising: receiving a route associated with a vehicle in an environment, the route including a start state and an end state; determining, based at least in part on the route, a first road segment and a second road segment; receiving, by the vehicle, a first lattice subgraph associated with the first road segment, and a second lattice subgraph associated with the second road segment; determining, based at least in part on the first lattice subgraph, a first cost associated with controlling the vehicle between a first entry state of the first road segment and a first exit state of the first road segment; and determining, based at least in part on the second lattice subgraph, a second cost associated with controlling the vehicle between a second entry state of the second road segment and a second exit state of the second road segment, wherein the first exit state of the first road segment is co-located with the second entry state of the second road segment; determining, based at least in part on the first cost and the second cost, a third cost associated with controlling the vehicle between the first entry state of the first road segment and the end state; determining, based at least in part on a cost plot, a fourth cost associated with controlling the vehicle between the start state and the first entry state of the first road segment; determining, based at least in part on the third cost and the fourth cost, a trajectory between the start state and the end state; and controlling the vehicle based at least in part on the trajectory.

P. The one or more non transitory computer readable media of paragraph O, wherein the first road segment includes the first entry state and a third entry state, and wherein determining the trajectory comprises: determining a first trajectory cost of a first trajectory between the start state and the end state, wherein the first trajectory is associated with the first entry state of the first road segment; determining a second trajectory cost of a second trajectory between the start state and the end state, wherein the second trajectory is associated with the third entry state of the first road segment; and determining, as the trajectory, the first trajectory, based at least in part on comparing the first trajectory cost to the second trajectory cost.

Q. The one or more non transitory computer readable media of paragraph P, wherein: the first road segment includes the first exit state and a third exit state; the first trajectory is associated with the first exit state of the first road segment; and the second trajectory is associated with the third exit state of the first road segment.

R. The one or more non transitory computer readable media of paragraph O, wherein the first road segment and the second road segment are adjacent road segments of different driving lanes, and wherein the trajectory includes a lane change driving maneuver associated with the first exit state of the first road segment and the second entry state of the second road segment.

S. The one or more non transitory computer readable media of paragraph O, wherein the start state is not within the first road segment or the second road segment, the operations further comprising: determining an additional state within the first road segment; and determining a fifth cost associated with controlling the vehicle between the additional state within the first road segment and the first exit state of the first road segment, wherein the fifth cost is determined after determining the third cost.

T. The one or more non transitory computer readable media of paragraph S, wherein: determining the fourth cost is performed by a first process executing on a graphics processing unit (GPU) on the vehicle; and determining the fifth cost is performed by a second process executing on the GPU, wherein the first process and the second process are executed in parallel.

U. A system comprising: one or more processors; and one or more non-transitory computer-readable media storing computer-executable instructions that, when executed, cause the one or more processors to perform operations comprising: receiving road network data representing a first road segment and a second road segment, the road network data including: a first lattice associated with the first road segment; and a second lattice associated with the second road segment, wherein the first lattice and the second lattice are based at least in part on kinematic capability of a type of vehicle; determining, based at least in part on the first lattice, a first lattice subgraph associated with the first road segment, the first lattice subgraph including a first entry state of the first road segment, a first exit state of the first road segment, a first edge associated with a first kinematically feasible transition between the first entry state and the first exit state, and a first cost associated with the first transition; determining, based at least in part on the second lattice, a second lattice subgraph associated with the second road segment, the second lattice subgraph including a second entry state of the second road segment, a second exit state of the second road segment, a second edge associated with a second kinematically feasible transition between the second entry state and the second exit state, and a second cost associated with the second transition, wherein the first exit state is co-located with the second entry state; and transmitting the first lattice subgraph and the second lattice subgraph to a vehicle.

V. The system of paragraph U, the operations further comprising: determining, based at least in part on the first lattice subgraph and the second lattice subgraph, a third lattice subgraph associated with a map region including the first road segment and the second road segment, wherein the third lattice subgraph includes the first entry state, the second exit state, a third edge associated with a third kinematically feasible transition between the first entry state and the second exit state, and a third cost associated with the third transition; and transmitting the third lattice subgraph to the vehicle.

W. The system of paragraph U, wherein: the first lattice subgraph includes a first plurality of exit states, including the first exit state; the second lattice subgraph includes a second plurality of entry states, including the second entry state; and an entry state of the second plurality of entry states is co-located with an exit state of the first plurality of exit states.

X. The system of paragraph U, the operations further comprising: determining a first kinematically feasible movement associated with the type of vehicle based at least in part on a model of the type of vehicle; determining a heuristic cost associated with the first kinematically feasible movement; and determining at least one of the first cost or the second cost based at least in part on the heuristic cost.

Y. The system of paragraph U, wherein the first lattice includes a plurality of states within the interior of the first road segment, and a cost associated with one of the plurality of states, and wherein determining the first lattice subgraph comprises executing a graph search algorithm on the first lattice, wherein the graph search algorithm is executed backward starting at the first exit state and ending at the first entry state.

Z. A method comprising: receiving, from a road network database, road network data representing a first road segment and a second road segment; determining a first lattice subgraph associated with the first road segment, the first lattice subgraph including a first node associated with a first entry state of the first road segment, a second node associated with a first exit state of the first road segment, a first edge associated with a first kinematically feasible transition between the first entry state and the first exit state, and a first cost associated with the first transition; determining a second lattice subgraph associated with the second road segment, the second lattice subgraph including a third node associated with a second entry state of the second road segment, a fourth node associated with a second exit state of the second road segment, a second edge associated with a second kinematically feasible transition between the second entry state and the second exit state, and a second cost associated with the second transition, wherein the first exit state is co-located with the second entry state; and transmitting the first lattice subgraph and the second lattice subgraph to a vehicle.

AA. The method of paragraph Z, further comprising: determining, based at least in part on the first lattice subgraph and the second lattice subgraph, a third lattice subgraph associated with a map region including the first road segment and the second road segment, wherein the third lattice subgraph includes a fifth node associated with the first entry state, a sixth node associated with the second exit state, a third edge associated with a third kinematically feasible transition between the first entry state and the second exit state, and a third cost associated with the third transition; and transmitting the third lattice subgraph to the vehicle.

AB. The method of paragraph AA, wherein the first road segment and the second road segment are laterally adjacent road segments, and wherein the third transition corresponds to a lane change by the vehicle, and wherein the first node and the second node are two of a plurality of nodes displaced along the first road segment at various offsets from a center line of the first road segment.

AC. The method of paragraph Z, wherein the first lattice subgraph includes: a first plurality of entry states, including the first entry state; a first plurality of exit states, including the first exit state; a first plurality of edges, including the first edge, wherein one of the first plurality of edges is associated with an entry state of the first plurality of entry states and an exit state of the first plurality of exit states; and a first plurality of costs, including a cost associated with one of the first plurality of edges.

AD. The method of paragraph AC, wherein the second lattice subgraph includes: a second plurality of entry states, including the second entry state, wherein an entry state of the second plurality of entry states is co-located with an exit state of the first plurality of exit states.

AE. The method of paragraph Z, further comprising: determining a first kinematically feasible movement associated with the vehicle; determining a heuristic cost associated with the first kinematically feasible movement; and determining at least one of the first cost or the second cost based at least in part on the heuristic cost.

AF. The method of paragraph Z, wherein the first node and the second node are two of a plurality of nodes displaced along the first road segment at various offsets from a center line of the first road segment, the method further comprising: receiving a first lattice associated with the first road segment, the first lattice including a plurality of states within the interior of the first road segment, and a cost associated with one of the plurality of states; determining, based at least in part on the first lattice: a first path between the first entry state and the first exit state; a first path cost associated with the first path; a second path between the first entry state and the first exit state; and a second path cost associated with the second path; and determining, based at least in part on comparing on the first path cost and the second path cost, the first edge.

AG. The method of paragraph AF, wherein determining the first lattice subgraph comprises: executing a graph search algorithm on the first lattice, wherein the graph search algorithm is executed backward starting at the first exit state and ending at the first entry state.

AH. One or more non transitory computer readable media storing instructions executable by a processor, wherein the instructions, when executed, cause the processor to perform operations comprising: receiving, from a road network database, road network data representing a first road segment and a second road segment; determining a first lattice subgraph associated with the first road segment, the first lattice subgraph including a first node associated with a first entry state of the first road segment, a second node associated with a first exit state of the first road segment, a first edge associated with a first kinematically feasible transition between the first entry state and the first exit state, and a first cost associated with the first transition; determining a second lattice subgraph associated with the second road segment, the second lattice subgraph including a third node associated with a second entry state of the second road segment, a fourth node associated with a second exit state of the second road segment, a second edge associated with a second kinematically feasible transition between the second entry state and the second exit state, and a second cost associated with the second transition, wherein the first exit state is co-located with the second entry state; and transmitting the first lattice subgraph and the second lattice subgraph to a vehicle.

AI. The one or more non transitory computer readable media of paragraph AH, the operations further comprising: determining, based at least in part on the first lattice subgraph and the second lattice subgraph, a third lattice subgraph associated with a map region including the first road segment and the second road segment, wherein the third lattice subgraph includes a fifth node associated with the first entry state, a sixth node associated with the second exit state, a third edge associated with a third kinematically feasible transition between the first entry state and the second exit state, and a third cost associated with the third transition; and transmitting the third lattice subgraph to the vehicle.

AJ. The one or more non transitory computer readable media of paragraph AH, wherein the first lattice subgraph includes: a first plurality of entry states, including the first entry state; a first plurality of exit states, including the first exit state; a first plurality of edges, including the first edge, wherein one of the first plurality of edges is associated with an entry state of the first plurality of entry states and an exit state of the first plurality of exit states; and a first plurality of costs, including a cost associated with one of the first plurality of edges.

AK. The one or more non transitory computer readable media of paragraph AJ, wherein the second lattice subgraph includes: a second plurality of entry states, including the second entry state, wherein an entry state of the second plurality of entry states is associated with an exit state of the first plurality of exit states.

AL. The one or more non transitory computer readable media of paragraph AH, the operations further comprising: determining a first kinematically feasible movement associated with a type of the vehicle based at least in part on a model of the type of vehicle; determining a heuristic cost associated with the first kinematically feasible movement; and determining at least one of the first cost or the second cost based at least in part on the heuristic cost.

AM. The one or more non transitory computer readable media of paragraph AH, the operations further comprising: receiving a first lattice associated with the first road segment, the first lattice including a plurality of states within the interior of the first road segment, and a cost associated with one of the plurality of states; determining, based at least in part on the first lattice: a first path between the first entry state and the first exit state; a first path cost associated with the first path; a second path between the first entry state and the first exit state; and a second path cost associated with the second path; and determining, based at least in part on comparing on the first path cost and the second path cost, the first edge.

AN. The one or more non transitory computer readable media of paragraph AM, wherein determining the first lattice subgraph comprises: executing a graph search algorithm on the first lattice, wherein the graph search algorithm is executed backward starting at the first exit state and ending at the first entry state.

While the example clauses described above are described with respect to particular implementations, it should be understood that, in the context of this document, the content of the example clauses can be implemented via a method, device, system, a computer-readable medium, and/or another implementation. Additionally, any of examples A-AN may be implemented alone or in combination with any other one or more of the examples A-AN.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:

one or more processors; and one or more non-transitory computer-readable media storing computer-executable instructions that, when executed, cause the one or more processors to perform operations comprising:

receiving road network data representing a first road segment and a second road segment, the road network data including:

a first lattice associated with the first road segment; and a second lattice associated with the second road segment, wherein the first lattice and the second lattice are based at least in part on kinematic capability of a type of autonomous vehicle;

determining, based at least in part on the first lattice, a first lattice subgraph associated with the first road segment, the first lattice subgraph including a first entry state of the first road segment, a first exit state of the first road segment, a first edge associated with a first kinematically feasible transition between the first entry state and the first exit state, and a first cost associated with the first transition;

determining, based at least in part on the second lattice, a second lattice subgraph associated with the second road segment, the second lattice subgraph including a second entry state of the second road segment, a second exit state of the second road segment, a second edge associated with a second kinematically feasible transition between the second entry state and the second exit state, and a second cost associated with the second transition, wherein the first exit state is co-located with the second entry state; and transmitting the first lattice subgraph and the second lattice subgraph to an autonomous vehicle, wherein the autonomous vehicle is configured to use the first lattice subgraph and the second lattice subgraph to traverse a driving environment.

2. The system of claim 1, the operations further comprising:

determining, based at least in part on the first lattice subgraph and the second lattice subgraph, a third lattice subgraph associated with a map region including the first road segment and the second road segment, wherein the third lattice subgraph includes the first entry state, the second exit state, a third edge associated with a third kinematically feasible transition between the first entry state and the second exit state, and a third cost associated with the third transition; and transmitting the third lattice subgraph to the autonomous vehicle.

3. The system of claim 1, wherein:

the first lattice subgraph includes a first plurality of exit states, including the first exit state;

the second lattice subgraph includes a second plurality of entry states, including the second entry state; and an entry state of the second plurality of entry states is co-located with an exit state of the first plurality of exit states.

4. The system of claim 1, the operations further comprising:
- determining a first kinematically feasible movement associated with the type of autonomous vehicle based at least in part on a model of the type of autonomous vehicle;
- determining a heuristic cost associated with the first kinematically feasible movement; and
- determining at least one of the first cost or the second cost based at least in part on the heuristic cost.

5. The system of claim 1, wherein the first lattice includes a plurality of states within an interior of the first road segment, and a cost associated with each of the plurality of states, and
- wherein determining the first lattice subgraph comprises executing a graph search algorithm on the first lattice, wherein the graph search algorithm is executed backward starting at the first exit state and ending at the first entry state.

6. A method comprising:
- receiving, from a road network database, road network data representing a first road segment and a second road segment;
- determining a first lattice subgraph associated with the first road segment, the first lattice subgraph including a first node associated with a first entry state of the first road segment, a second node associated with a first exit state of the first road segment, a first edge associated with a first kinematically feasible transition between the first entry state and the first exit state, and a first cost associated with the first transition;
- determining a second lattice subgraph associated with the second road segment, the second lattice subgraph including a third node associated with a second entry state of the second road segment, a fourth node associated with a second exit state of the second road segment, a second edge associated with a second kinematically feasible transition between the second entry state and the second exit state, and a second cost associated with the second transition, wherein the first exit state is co-located with the second entry state; and
- transmitting the first lattice subgraph and the second lattice subgraph to an autonomous vehicle, wherein the autonomous vehicle is configured to use the first lattice subgraph and the second lattice subgraph to traverse a driving environment.

7. The method of claim 6, further comprising:
- determining, based at least in part on the first lattice subgraph and the second lattice subgraph, a third lattice subgraph associated with a map region including the first road segment and the second road segment, wherein the third lattice subgraph includes a fifth node associated with the first entry state, a sixth node associated with the second exit state, a third edge associated with a third kinematically feasible transition between the first entry state and the second exit state, and a third cost associated with the third transition; and
- transmitting the third lattice subgraph to the autonomous vehicle.

8. The method of claim 7, wherein the first road segment and the second road segment are laterally adjacent road segments, and wherein the third transition corresponds to a lane change by the autonomous vehicle, and
- wherein the first node and the second node are two of a plurality of nodes displaced along the first road segment at various offsets from a center line of the first road segment.

9. The method of claim 6, wherein the first lattice subgraph includes:
- a first plurality of entry states, including the first entry state;
- a first plurality of exit states, including the first exit state;
- a first plurality of edges, including the first edge, wherein one of the first plurality of edges is associated with an entry state of the first plurality of entry states and an exit state of the first plurality of exit states; and
- a first plurality of costs, including a cost associated with one of the first plurality of edges.

10. The method of claim 9, wherein the second lattice subgraph includes:
- a second plurality of entry states, including the second entry state, wherein an entry state of the second plurality of entry states is co-located with an exit state of the first plurality of exit states.

11. The method of claim 6, further comprising:
- determining a first kinematically feasible movement associated with the autonomous vehicle;
- determining a heuristic cost associated with the first kinematically feasible movement; and
- determining at least one of the first cost or the second cost based at least in part on the heuristic cost.

12. The method of claim 6, wherein the first node and the second node are two of a plurality of nodes displaced along the first road segment at various offsets from a center line of the first road segment, the method further comprising:
- receiving a first lattice associated with the first road segment, the first lattice including a plurality of states within an interior of the first road segment, and a cost associated with one of the plurality of states;
- determining, based at least in part on the first lattice:
  - a first path between the first entry state and the first exit state;
  - a first path cost associated with the first path;
  - a second path between the first entry state and the first exit state; and
  - a second path cost associated with the second path; and
- determining, based at least in part on comparing on the first path cost and the second path cost, the first edge.

13. The method of claim 12, wherein determining the first lattice subgraph comprises:
- executing a graph search algorithm on the first lattice, wherein the graph search algorithm is executed backward starting at the first exit state and ending at the first entry state.

14. One or more non-transitory computer-readable media storing instructions executable by a processor, wherein the instructions, when executed, cause the processor to perform operations comprising:
- receiving, from a road network database, road network data representing a first road segment and a second road segment;
- determining a first lattice subgraph associated with the first road segment, the first lattice subgraph including a first node associated with a first entry state of the first road segment, a second node associated with a first exit state of the first road segment, a first edge associated with a first kinematically feasible transition between the first entry state and the first exit state, and a first cost associated with the first transition;
- determining a second lattice subgraph associated with the second road segment, the second lattice subgraph including a third node associated with a second entry state of the second road segment, a fourth node associated with a second exit state of the second road segment, a second edge associated with a second kinematically feasible transition between the second entry state and the second exit state, and a second cost associated with the second transition, wherein the first exit state is co-located with the second entry state; and transmitting the first lattice subgraph and the second lattice subgraph to an autonomous vehicle, wherein the autonomous vehicle is configured to use the first lattice subgraph and the second lattice subgraph to traverse a driving environment.

15. The one or more non-transitory computer-readable media of claim 14, the operations further comprising:
determining, based at least in part on the first lattice subgraph and the second lattice subgraph, a third lattice subgraph associated with a map region including the first road segment and the second road segment, wherein the third lattice subgraph includes a fifth node associated with the first entry state, a sixth node associated with the second exit state, a third edge associated with a third kinematically feasible transition between the first entry state and the second exit state, and a third cost associated with the third transition; and
transmitting the third lattice subgraph to the autonomous vehicle.

16. The one or more non-transitory computer-readable media of claim 14, wherein the first lattice subgraph includes:
a first plurality of entry states, including the first entry state;
a first plurality of exit states, including the first exit state;
a first plurality of edges, including the first edge, wherein one of the first plurality of edges is associated with an entry state of the first plurality of entry states and an exit state of the first plurality of exit states; and
a first plurality of costs, including a cost associated with one of the first plurality of edges.

17. The one or more non-transitory computer-readable media of claim 16, wherein the second lattice subgraph includes:

a second plurality of entry states, including the second entry state, wherein an entry state of the second plurality of entry states is associated with an exit state of the first plurality of exit states.

18. The one or more non-transitory computer-readable media of claim 14, the operations further comprising:
determining a first kinematically feasible movement associated with a type of the autonomous vehicle based at least in part on a model of the type of autonomous vehicle;
determining a heuristic cost associated with the first kinematically feasible movement; and
determining at least one of the first cost or the second cost based at least in part on the heuristic cost.

19. The one or more non-transitory computer-readable media of claim 14, wherein the first node and the second node are two of a plurality of nodes displaced along the first road segment at various offsets from a center line of the first road segment, the operations further comprising:
receiving a first lattice associated with the first road segment, the first lattice including a plurality of states within an interior of the first road segment, and a cost associated with one of the plurality of states;
determining, based at least in part on the first lattice:
a first path between the first entry state and the first exit state;
a first path cost associated with the first path;
a second path between the first entry state and the first exit state; and
a second path cost associated with the second path; and
determining, based at least in part on comparing on the first path cost and the second path cost, the first edge.

20. The one or more non-transitory computer-readable media of claim 19, wherein determining the first lattice subgraph comprises:
executing a graph search algorithm on the first lattice, wherein the graph search algorithm is executed backward starting at the first exit state and ending at the first entry state.

* * * * *